US012795582B2

(12) United States Patent
Zhou et al.

(10) Patent No.: US 12,795,582 B2
(45) Date of Patent: Nov. 10, 2026

(54) METHOD AND APPARATUS FOR SIDELINK POSITIONING

(71) Applicant: Samsung Electronics Co., Ltd., Gyeonggi-do (KR)

(72) Inventors: Yuhan Zhou, San Diego, CA (US); Philippe Jean Marc Michel Sartori, Naperville, IL (US); Yaser Mohamed Mostafa Kamal Fouad, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 579 days.

(21) Appl. No.: 18/106,748

(22) Filed: Feb. 7, 2023

(65) Prior Publication Data

US 2023/0319768 A1 Oct. 5, 2023

Related U.S. Application Data

(60) Provisional application No. 63/326,025, filed on Mar. 31, 2022.

(51) Int. Cl.
*H04W 64/00* (2009.01)

(52) U.S. Cl.
CPC .................................. *H04W 64/00* (2013.01)

(58) Field of Classification Search
None
See application file for complete search history.

(56) References Cited

U.S. PATENT DOCUMENTS

| | | | | |
|---|---|---|---|---|
| 11,356,814 | B1 * | 6/2022 | Choi | H04L 5/0048 |
| 2021/0051622 | A1 | 2/2021 | Manolakos et al. | |
| 2021/0297206 | A1 | 9/2021 | Manolakos et al. | |
| 2022/0015057 | A1 | 1/2022 | Bao et al. | |
| 2022/0046383 | A1 | 2/2022 | Nagori et al. | |
| 2022/0236365 | A1 | 7/2022 | Ko et al. | |
| 2022/0272592 | A1 * | 8/2022 | Choi | H04W 36/0009 |
| 2024/0137180 | A1 * | 4/2024 | Manolakos | H04L 5/0051 |

FOREIGN PATENT DOCUMENTS

| | | |
|---|---|---|
| CN | 114222931 | 3/2022 |
| TW | 201939974 | 10/2019 |
| TW | 202132810 | 9/2021 |
| WO | WO 2021/040495 | 3/2021 |
| WO | WO 2021/086093 | 5/2021 |
| WO | WO 2021/194801 | 9/2021 |

OTHER PUBLICATIONS

Intel, "Revised SID on Study on expanded and improved NR positioning", 3GPP TSG RAN Meeting #94e, RP-213588, Electronic Meeting, Dec. 6-17, 2021, pp. 6.

(Continued)

*Primary Examiner* — Suhail Khan

(74) *Attorney, Agent, or Firm* — The Farrell Law Firm, P.C.

(57) ABSTRACT

A system and a method are provided in which a user equipment (UE) obtains a positioning reference signal (PRS) configuration message from an anchor UE based on a basic safety message (BSM) of the anchor UE. The UE receives a sidelink PRS from the anchor UE based on the PRS configuration message, and perform a positioning measurement based on the received PRS.

20 Claims, 19 Drawing Sheets

(56) References Cited

OTHER PUBLICATIONS

3GPP TS 37.355 V17.3.0 (Dec. 2022), Technical Specification, 3rd Generation Partnership Project; Technical Specification Group Radio Access Network; LTE Positioning Protocol (LPP) (Release 17), pp. 348.
3GPP TS 22.261 V19.1.0 (Dec. 2022), Technical Specification, 3rd Generation Partnership Project; Technical Specification Group Services and System Aspects; Service requirements for the 5G system; Stage 1 (Release 19), pp. 115.
3GPP TS 22.186 V17.0.0 (Mar. 2022), Technical Specification, 3rd Generation Partnership Project; Technical Specification Group Services and System Aspects; Enhancement of 3GPP support for V2X scenarios; Stage 1 (Release 17), pp. 18.
3GPP TS 38.214 V17.4.0 (Dec. 2022), Technical Specification, 3rd Generation Partnership Project; Technical Specification Group Radio Access Network; NR; Physical layer procedures for data (Release 17), pp. 230.
OPPO, LG Electronics, "New WID on NR sidelink evolution", 3GPP TSG RAN Meeting #94e, RP213678, Electronic Meeting, Dec. 6-17, 2021, pp. 6.
Catt, "Further discussion of NR RAT-dependent DL Positioning", 3GPP Tsg Ran WG1 Meeting#96, R1-1901980, Athens, Greece, Feb. 25-Mar. 1, 2019, pp. 31.
Nokia, "Enhanced positioning accuracy for Rel-18", RAN Rel-18 Workshop, Jun. 28-Jul. 2, 2021, RWS-210117, Nokia, Nokia Shanghai Bell, pp. 10.
3GPP TS 38.133 V17.8.0 (Dec. 2022), Technical Specification, 3rd Generation Partnership Project; Technical Specification Group Radio Access Network; NR; Requirements for support of radio resource management (Release 17), pp. 5862.
Taiwanese Office Action dated Apr. 14, 2026 issued in counterpart application No. 112111653, 14 pages.

* cited by examiner

SL configured grant Type 1

SL configured grant Type 2

METHOD AND APPARATUS FOR SIDELINK POSITIONING

CROSS-REFERENCE TO RELATED APPLICATIONS

This application claims the priority benefit under 35 U.S.C. § 119(e) of U.S. Provisional Application Nos. 63/326,025 filed on Mar. 31, 2022, the disclosure of which is incorporated by reference in its entirety as if fully set forth herein.

TECHNICAL FIELD

The disclosure generally relates to sidelink positioning. More particularly, the subject matter disclosed herein relates to performing sidelink positioning by using different positioning methods and carrier phase measurement.

SUMMARY

In 3rd Generation Partnership Project (3GPP) Release (Rel)-16/17, positioning for a new radio (NR) link between a universal mobile telecommunications system (UMTS) terrestrial radio access network (UTRAN) and a user equipment (UE) (i.e., an NR Uu link) was standardized for the cellular link. In 3GPP Rel-18, positioning protocols are extended for the sidelink. A protocol to perform sidelink positioning differs from a cellular protocol due to the absence of a central controller on the sidelink.

To solve this problem, the UE must determine when to send reference signals (RSs) for positioning, where to obtain the various configurations for positioning, and where to report positioning information. Since resource allocation is distributed (e.g., there is no central controller), mechanisms are needed to limit/avoid collisions.

One issue with the above approach is that there are widely different scenarios for sidelink positioning. Some scenarios cover UEs at high speeds (e.g., rural highways), whereas others cover UEs in traffic jam conditions in urban environments.

To overcome these issues, solutions are provided to perform positioning for sidelink by using different positioning methods including, for example, round trip time (RTT), angle of arrival (AoA)/angle of departure (AoD), and carrier phase measurement.

The above approaches improve on previous methods because they focus on ensuring that positioning overhead is low in order to be deployed at scale, ensuring there is low latency, and providing frequent positioning updates.

In an embodiment, a method is provided in which a UE obtains a positioning reference signal (PRS) configuration message from an anchor UE based on a basic safety message (BSM) of the anchor UE. The UE receives a sidelink PRS from the anchor UE based on the PRS configuration message, and performs a positioning measurement based on the received PRS.

In an embodiment, a UE is provided that includes a processor and a non-transitory computer readable storage medium storing instructions. When executed, the instructions cause the processor to obtain a PRS configuration message from an anchor UE based on a BSM of the anchor UE, receive a sidelink PRS from the anchor UE based on the PRS configuration message; and perform a positioning measurement of the UE based on the received PRS.

In an embodiment, a system includes a first UE and a second UE. The first UE obtains a PRS configuration message based on a BSM, receives a sidelink PRS based on the PRS configuration message, and performs a positioning measurement based on the received PRS. The second UE transmits the BSM, the PRS configuration message, and the sidelink PRS.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
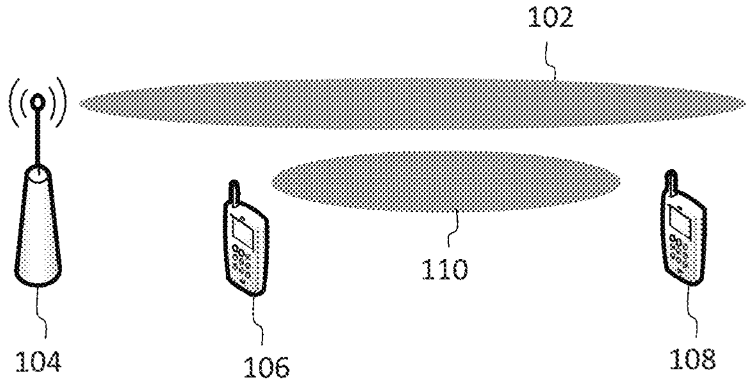
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a base station or a gNode B (gNB) 104, a first UE 106, and a second UE 108. A data path 110 may enable the transmission of data (and some control information) on a sidelink between the first UE 106 and the second UE 108. The control path 102 and the data path 110 may be on the same frequency or may be on different frequencies.

In 3GPP Rel-16, multi-cell RTT was standardized as a positioning solution. Wi-Fi uses similar ideas to perform indoor positioning. The general idea of the multi-cell RTT method is to estimate the RTT between a UE and multiple gNBs by transmitting and receiving signals between the necessary devices. The distances between the UE and the gNBs are then estimated using RTT. Then, similar to other timing-based techniques (e.g., downlink (DL)-time difference of arrival (TDOA)) a trilateration estimation algorithm can be used to estimate the position of the UE. In DL-TDOA one source of timing estimation error is the synchronization errors between the gNBs. The advantage of using the RTT to estimate the distance between a UE and a gNB is that these synchronization errors are no longer a factor. However, multi-RTT methods have increased resource overhead due to the use of both DL PRSs and uplink (UL)s PRSs.

UE Rx-transmit (Tx) time difference measurement and gNB Rx-Tx time difference measurement were provided in long term evolution (LTE), but were only for a serving cell when an enhanced cell ID (E-CID) method was used. In NR these measurements are also defined for neighboring cells.

An RTT mechanism can be supported in NR for a link between a UE and a serving gNB. Depending on deployment scenarios and network synchronization assumptions, RTT based positioning solutions may be enabled when neighboring cells/transmission reception points (TRPs) are tightly synchronized, or when neighboring cells/TRPs are loosely synchronized.

If neighboring cells are tightly synchronized, RTT measurements may be collected through ranging with a serving/reference neighbor cell and reference signal time difference (RSTD) measurements from neighboring cells with respect to the serving/reference neighbor cell. The advantage of this approach is that neighboring cells/TRPs do not need to perform timing measurements for UEs served by other cells/TRPs. In implementation, TRPs may be tightly synchronized with each other. The synchronization error between reference TRPs, which has an impact on the RSTD measurement accuracy, may be mitigated by the multi-RTT method. If neighboring cells are not accurately synchronized in time, the RTT may be obtained by independently measuring the UE Rx-Tx time difference and the gNB Rx-Tx time difference.

The RTT from the serving cell and reference neighbor cells may be calculated by adding the UE Rx-Tx time difference and the gNB Rx-Tx time difference. The UE does not need to measure the RSTD between different TRPs, and therefore, the multi-RTT scheme is resistant to cell synchronization errors.

In a first phase-difference based signal direction estimation method, a transmitting device sends multiple PRS resources. Each PRS resource is transmitted via each of the physical antennas. As each PRS from the antenna array arrives at a receiver's single antenna, it is phase-shifted from the previous PRS due to the different distance it has traveled from the transmitter. The AoD may be estimated by measuring the phase difference between the PRS resources using a simple formula.

In this first method, the receiver is only required to know the mapping of the PRS resources into the physical antennas, along with the antenna configuration (e.g., uniform linear array (ULA), uniform planar array (UPA), single or multi-panel) of the TRP and the relative distance of the antennas.

In a second phase-difference based signal direction estimation method, the UE utilizes two antennas to receive the same PRS signal. Once the phase difference between the PRS at two received antennas is measured with the knowledge of antenna distance, the AoA of the PRS signal may be obtained by Equation (1) below.

$$\theta = \arccos\left(\frac{\psi\lambda}{2\pi d}\right) \tag{1}$$

where $\psi$ is the phase difference, $\lambda$ is the wave length, and d is the distance between two adjacent antennas.

Cells may transmit carrier phase PRSs (C-PRSs) to support the UE to obtain the carrier phase measurements. A C-PRS may be a pure carrier wave of sinusoidal signals at a pre-configured or pre-defined carrier frequency. The bandwidth of a C-PRS may be small, depending only on the impairment of a base station (BS) radio frequency (RF) transmitter. The transmission of the C-PRS may be carried out at an edge of the carrier or a guard-band of the carrier without causing inter-channel interferences to neighboring carriers.

When carrier phase positioning is applied to cellular communications, the carrier phase measurement may be performed in a digital domain. Specifically, assuming that $Y_{FAP}[l]$ is a time domain output of a first arrival detector and $Y_{PRS}[l]$ is a detected PRS sequence in the time domain, the carrier phase offset is estimated using Equation (2) below.

$$\Delta\varphi = \angle\left(\frac{1}{N}\sum_{l=1}^{N} Y_{PRS}^{*}[l]Y_{FAP}[l]\right) \tag{2}$$

where N is the number of symbols for the correlation operation.

In performing phase measurements in an analog domain, the sender transmits the C-PRSs to the UE to obtain the carrier phase measurements. The PRS can be a pure carrier wave of sinusoidal signals at a pre-configured or pre-defined carrier frequency. The UE can measure the carrier phase through a phase locked loop (PLL), in which the accuracy depends on the carrier frequency.

In performing phase measurements in a digital domain, the carrier phase can be estimated in the digital domain by the estimation theory, estimation of signal parameters via rotational invariant techniques (ESPRIT) method. First, the ESPRIT method is applied to distinguish the line-of-sight (LoS) path and the multiple paths as much as possible. Then, the propagation delay of the direct LoS path determined by the ESPRIT method is used to estimate the carrier phase in the second step.

For carrier phase measurement with digital implementation, the estimation error depends on the PRS bandwidth. Thus, wide band signals, such as the PRSs designed for 3GPP Rel 16/Rel 17 positioning, are preferred.

When performing sidelink positioning for sidelink vehicle-to-everything (V2X), the protocol should meet the following constraints. First, with respect to low overhead, positioning should be constantly updated so that the UEs know where they are with respect to each other. Thus, the PRSs should occupy a relatively small number of REs, and the measurement reporting should be sent in a low-overhead manner. For example, using the physical sidelink control channel (PSCCH) and transmission over a full subchannel (e.g., 10 MHz) is too much overhead.

Second, with respect to low latency, a vehicle moving at 150 kilometers/hour (km/h) moves at 41.7 meters/second (m/s). A latency of 100 ms results in a positioning error of 4.2 m. Third, with respect to frequent positioning updates (i.e., the period of position updating), in order to have accurate positioning, the UEs should perform positioning frequently (e.g., approximately every 100 ms).

In addition, sidelink transmission is distributed and is without a central controller like a gNB. This makes the positioning protocol more difficult to establish, since the UE performing measurements must know which resources the other UE is using for positioning (e.g., PRS location in time/frequency/code), and which parameters it uses (e.g., frequency of transmission). Therefore, there is a need for a distributed protocol for UEs to perform positioning.

A distributed protocol is provided herein. In addition, positioning accuracy requirements are based on BSM information. Resource allocation for PRSs is based on BSM information. PRS resource pool design for a carrier phase method including the PRS configuration content, a procedure for UE obtaining the pool configuration, and collision mitigation are provided. UE procedures for receiving the PRS for carrier phase positioning including PRS resource allocation design, the processing priority of PRS, and power control are provided. UE location determination for frequency-based carrier phase positioning is provided. UE mobility compensation for sidelink positioning is provided. Positioning measurement reporting in sidelink is provided. In addition, both relative and absolute positioning are covered.

According to an embodiment, the UE uses relatively coarse location information received in the BSM to determine how close other UEs are. Then, relying on information in the BSM, the UE may determine where to find PRSs, as well as an exact PRS configuration.

For V2X application, depending on the distances between a Tx UE and an Rx UE, different UEs may require different quality of service (QoS) for the positioning. Typically, when a UE is relatively far away, the accuracy does not need to be that high. However, when the UE (e.g., a car) is close-by, high accuracy is needed to ensure that UEs maintain a safe, minimum distance between them.

Figure 2:
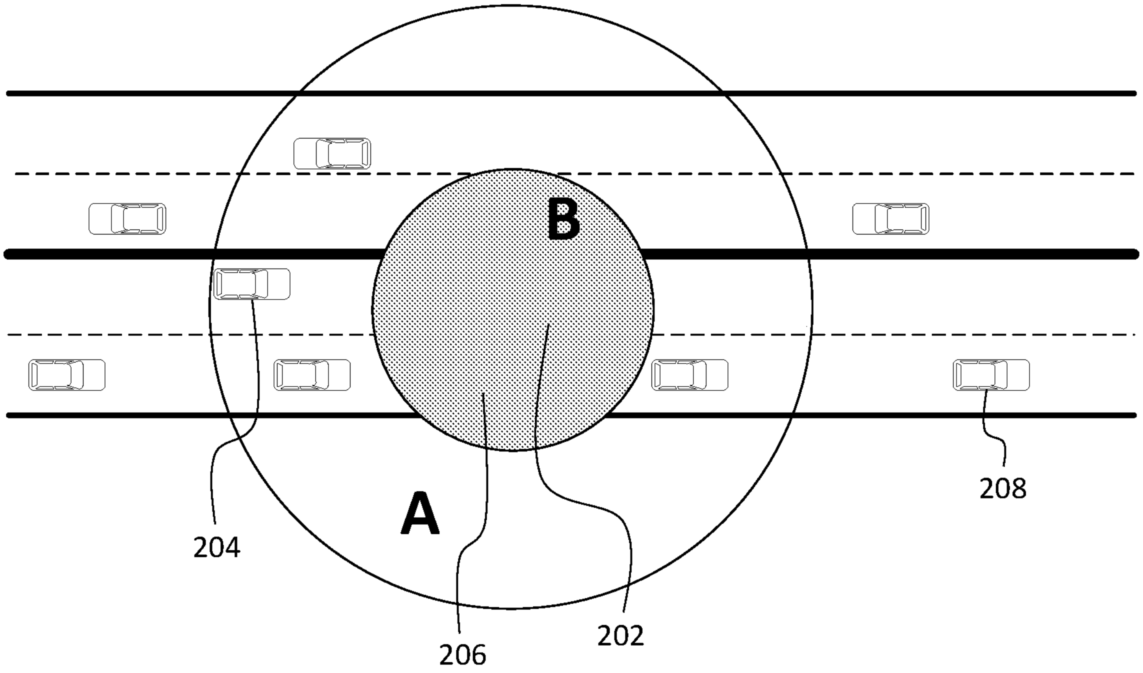
FIG. 2 is a diagram illustrating sidelink positioning in different zones, according to an embodiment.

FIG. 2 is a diagram illustrating sidelink positioning in different zones, according to an embodiment. UEs in different zones have different positioning accuracy requirements. For example, a Rx UE 202 requires low positioning accuracy for zone A and high positioning accuracy for zone B. For a first target UE 204 in zone A, basic positioning methods may be applied for low accuracy. For a second target UE 206 in zone B, advanced positioning methods may be applied for high accuracy. Herein, the terms "target UE" and "anchor UE" are used interchangeably.

For a third target UE 208 outside of zones A and B, the BSM information, which is shown in Table 1 below, may be used in determining the UE's location. The BSM carries the UE location (typically obtained from a global navigation satellite system (GNSS)).

Figure 3:
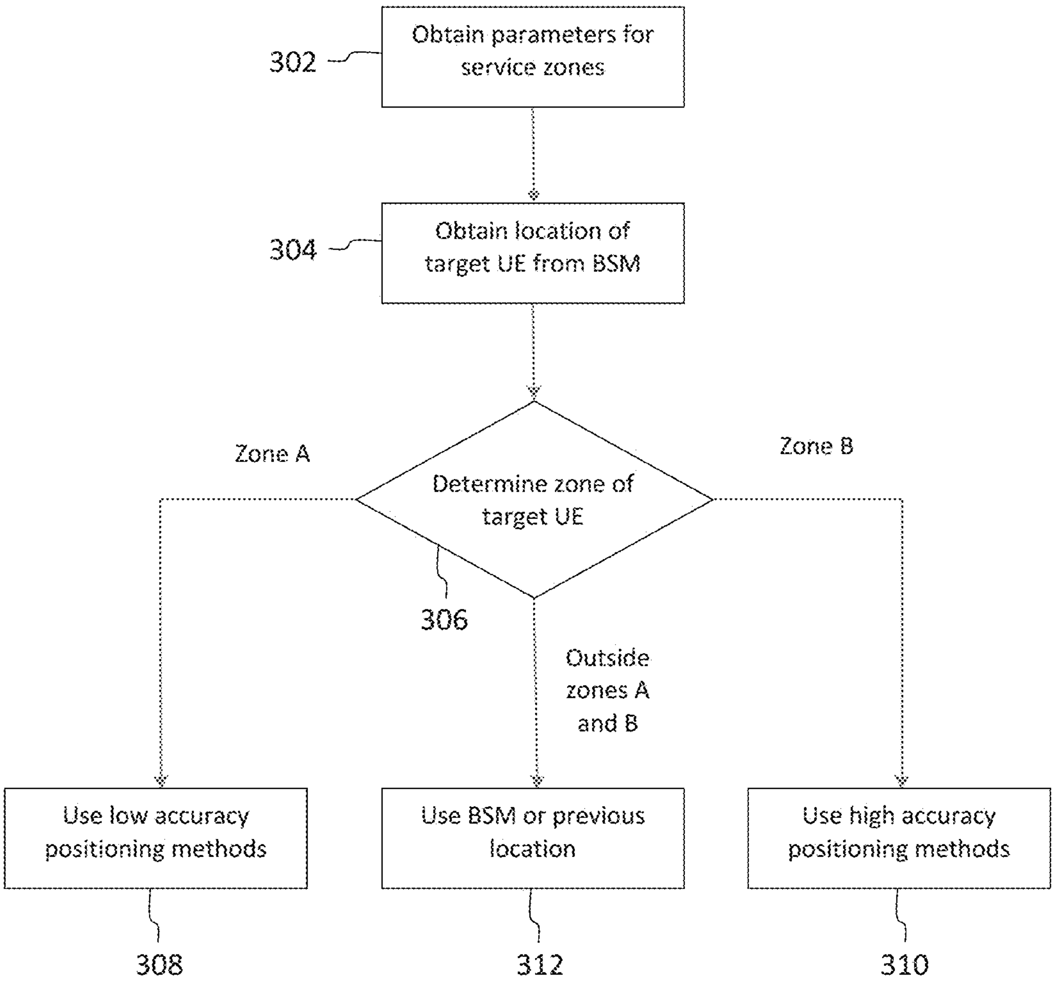
FIG. 3 is a flowchart illustrating a method for service zone determination for target UE positioning, according to an embodiment.

FIG. 3 is a flowchart illustrating a method of service zone determination for target UE positioning, according to an embodiment.

At 302, the UE may obtain parameters to determine service zones surrounding the UE. The values may be pre-configured and static. However, the parameters may also be adaptive based on the environment. For example, parameters in a parking lot should be different than parameters in an urban street or on a rural highway. Thus, a message may be required to indicate zone definitions.

This indication may be performed by pre-configuration. A map with defined areas may be transmitted to the UE. Each area is associated with a set of zone of parameters. This may also be performed by radio resource control (RRC) signaling communicated by a gNB, another UE (e.g., a platoon head), or a road side unit (e.g., traffic light at an intersection).

The zone configuration/pre-configuration may include the number of zones, dimensions of the zones (e.g., radius around a vehicle in FIG. 2), frequency at which location PRSs should be transmitted, PRS priority, and periodicity of the PRS transmission.

The zones may be defined differently according to speed. For example, for high speeds, zone A is bigger than that at low speeds. In such a case, the parameters listed above are defined for a range of speeds.

At 304, the UE obtains a location of a target UE from a BSM message, either received on an LTE sidelink carrier or an NR sidelink carrier.

Based on the target UE location and the UE's own location, the UE determines a distance between the two UEs and determines the zone that the target UE is in, at 306. Based on the zone of the target UE, a positioning method may then be determined.

When the UE determines that the target UE is within zone A, a low accuracy positioning method may be used, at 308. When the UE determines that the target UE is within zone B, a high accuracy positioning method may be used, at 310.

TABLE 1

| Type | Description | Size (byte) |
|---|---|---|
| DSRCmsgID | Data elements used in each message to define the Message type | 1 |
| MsgCount | It can check the flow of consecutive messages having the same DSRCmsgID received from the same message sender. | 1 |
| TemporaryID | Represents a 4-byte temporary device identifier. When used in a mobile OBU device, this value is periodically changed to ensure anonymity. | 4 |
| Dsecond | Represents two bytes of time information. | 2 |
| Latitude | Represents the geographic latitude of an object. | 4 |
| Longitude | Represents the geographic longitude of an object. | 4 |
| Elevation | Represents an altitude measured by the WGS84 coordinate system. | 2 |
| PositionAccuracy | Various quality parameters used to model the positioning accuracy for each given axis. | 4 |
| TransmissionAndSpeed | Represents the speed of the vehicle. | 2 |
| Heading | The current direction value is expressed in units of 0.0125 degrees. | 2 |
| SteeringWheelAngle | Represents the current steering angle of the steering wheel. | 1 |
| AccelerationSet4Way | It consists of three orthogonal directions of acceleration and yaw rate. | 7 |
| BrakeSystemStatus | Represents a data element that records various control states related to braking of the vehicle. | 2 |
| VehicleSize | Represents the length and width of the vehicle. | 3 |

Based on the BSM location information, the UE may derive an approximate distance for the target UE. When this approximate distance is below a threshold, the UE may switch to a more accurate positioning method. As shown in FIG. 2, more zones may be defined. For example, when the two cars are in very close proximity, a zone B may be defined, where the PRSs may have higher priority and/or may be transmitted more frequently.

When the UE determines that the target UE is not within zone A or B, BSM or a previous location may be used for positioning, at 312.

Inter-UE coordination may be applied to sidelink positioning. For example, the Tx UE may decode $2^{nd}$ stage sidelink control information (SCI) from the target UE and its neighboring UEs. If there is at least one neighboring UE named as an assisting UE, having the same zone ID as the target UE, then the Tx UE or Rx UE can request the assisting UE to send its location information. If the zone size is small, the target UE location can be estimated within a small range given the location of assisting UE.

Both the Tx UE and the Rx UE (i.e., the target UE) may be connected with networks. The rough estimation of the position of the target UE may be sent by a location management function (LMF) to the Tx UE through assistance data (AD) in an LTE positioning protocol.

Figure 4:
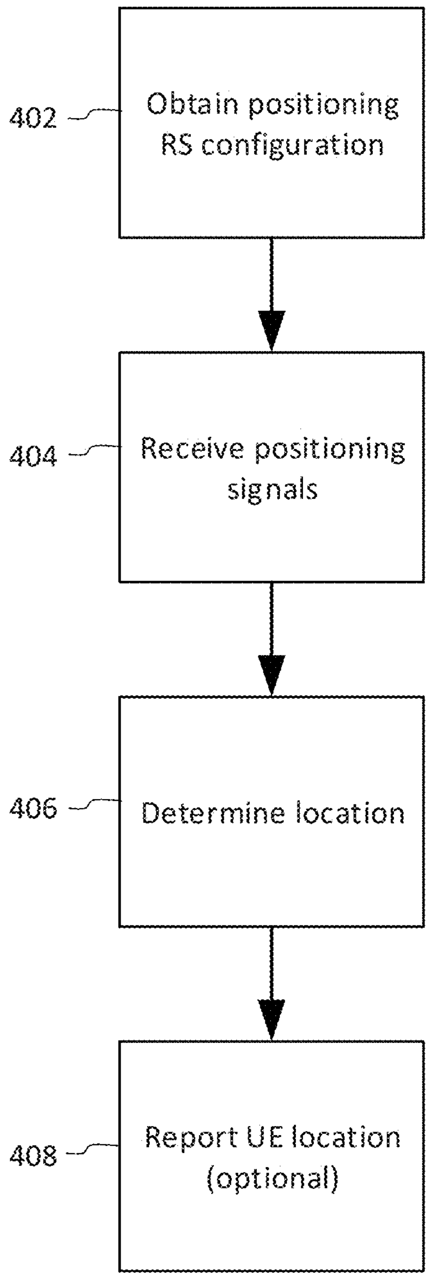
FIG. 4 is a flowchart illustrating a method for high-accuracy positioning, according to an embodiment.

FIG. 4 is a flowchart illustrating a high accuracy positioning procedure, according to an embodiment. High accuracy positioning may refer to the positioning performed in zone A or zone B described above. Instead of relying solely on the BSM, the UEs transmit PRSs for the purpose of positioning themselves relative to each other.

Positioning may be performed using signals sent from a single vehicle, as there may only be a single neighboring UE (e.g., in low density traffic). In such a configuration, the two UEs accurately position themselves relative to each other. Accordingly, a vehicle can send one, or preferably more than one, PRS.

Figure 5:
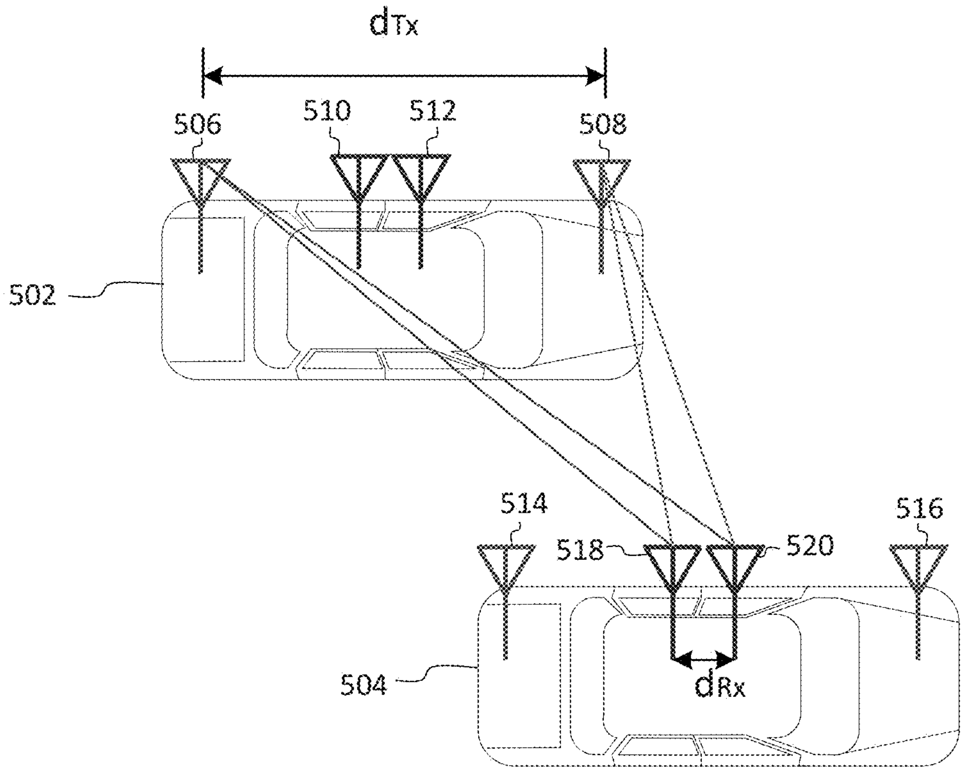
FIG. 5 is a diagram illustrating transmission of multiple positioning signals from a single vehicle, according to an embodiment.

FIG. 5 is a diagram illustrating the transmission of multiple PRSs from a single vehicle, according to an embodiment. By performing measurements on the PRSs (e.g., AoA, carrier phase), the UE receiving the PRSs can relatively position itself from the car.

In each of a Tx UE 502 and an Rx UE 504, two Tx antennas are spaced apart from each other (e.g., at the front and the back of a vehicle) at $d_{Tx}$, and two Rx antennas are located near each other in the vehicle at $d_{Rx}$. The Tx UE 502 includes a first transmitting antenna 506, a second transmitting antenna 508, a first receiving antenna 510, and a second receiving antenna 512. The Rx UE 504 includes a third transmitting antenna 514, a fourth transmitting antenna 516, a third receiving antenna 518, and a fourth receiving antenna 520. A PRS may be transmitted from one or both of the first transmitting antenna 506 and the second transmitting antenna 508, to one or both of the third receiving antenna 518 and the fourth receiving antenna 520. At the Rx UE 504, the carrier phases for the third receiving antenna 518 and the fourth receiving antenna 520 may be measured and reported. The Rx UE 504 may also measure the carrier phase difference at its two receiving antennas and reports it.

Referring back to FIG. 4, a positioning configuration message is obtained, at 402. In obtaining the positioning configuration message, the vehicle transmitting the PRS indicates the number of transmitted PRSs. A single transmission is possible. However, having multiple transmissions from a single vehicle significantly improves performance.

The vehicle also indicate PRS characteristics. The PRS signal may be a narrow band signal that occupies a single frequency tone or wide band signal. The PRS signal may be located in several consecutive symbols in the frequency domain. The PRS signal may be inside or outside of an active bandwidth part (BWP), and it may be located in multiple frequency bands.

The vehicle further indicates the shape of the vehicle. The vehicle may be modeled as a rectangle. Thus, the vehicle would indicate its length and width, and possibly the height of the vehicle. Several classes of cars could be defined (e.g., subcompact, SUV-small, SUV-medium, etc.). Each class may be uniquely associated with a pre-defined shape. The vehicle may then only need to indicate its class (e.g., by indicating an index). Such information may be obtained through the BSM and thus, in some cases, may be omitted. However, the vehicle types defined in the BSM may be too coarse for high-accuracy positioning. In addition, BSM does not include where the antennas are located.

The vehicle also indicates the location of the transmitting antennas. If the vehicle is modeled as a rectangle, the center of the rectangle may be an origin point, and the location of the antennas may be indicated by their relative coordinate from the origin point.

Figure 6:
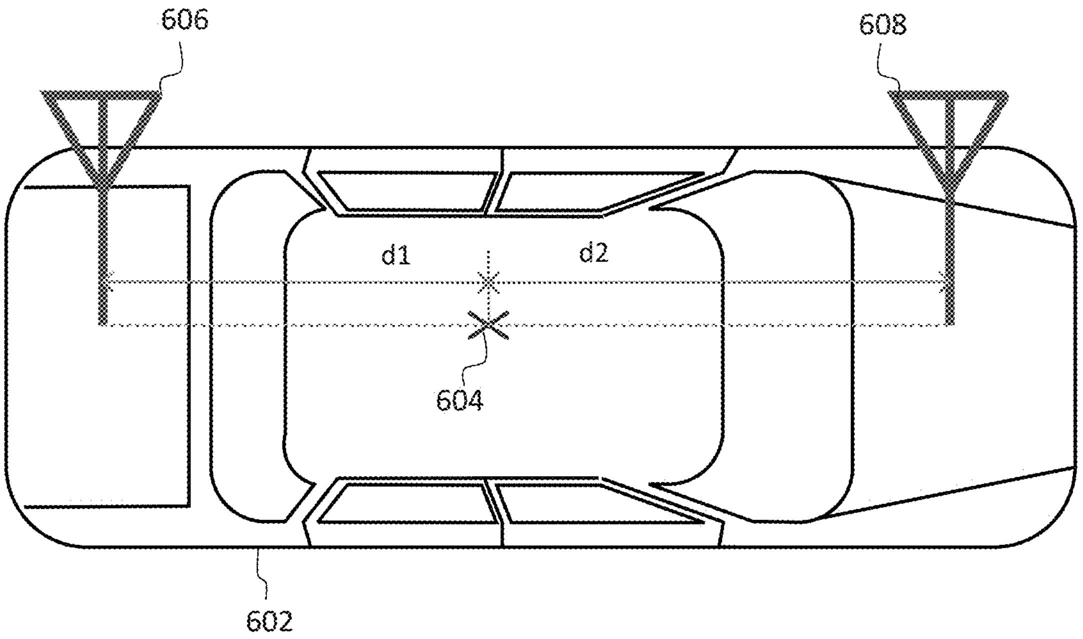
FIG. 6 is a diagram illustrating transmitting antenna locations with respect to a center of a vehicle, according to an embodiment.

FIG. 6 is a diagram illustrating transmitting antenna locations with respect to a center of a vehicle, according to an embodiment. A vehicle 602 includes an origin point 604, a first transmitting antenna 606 spaced d1 from the origin point 604, and a second transmitting antenna 608 spaced d2 from the origin point 604.

The UE may also report its location. In such a case, the reporting of the car's shape and the location of RX antenna may be needed, but not always required (e.g., if the reporting UE is a pedestrian). If needed, the receiving vehicle indicates parameters similar to those for the transmitting car.

In order for a UE to obtain an PRS configuration message, when the UE determines it is in close proximity to the target UE, the UE may then send an SCI to that UE to request the transmission of the PRS. The PRS may be configured as semi-persistent and aperiodic signals, which can be triggered by SCI or a medium access control (MAC) control element (CE).

However, this may incur high overhead since many resources (one subchannel over a slot) are sent to provide a relatively small message. Latency may also be relatively high in order to establish the link and exchange the information. However, this method of obtaining the PRS configuration message might be beneficial if both UEs are already communicating with each other. The PRS configuration message may be sent in a MAC CE along with the other data that the UEs are exchanging.

As an alternative, the UE may obtain a UE ID from the BSM. There is a one-to-one mapping between this UE ID and a location indicating the PRS resource set. This is described in greater detail below.

Figure 7:
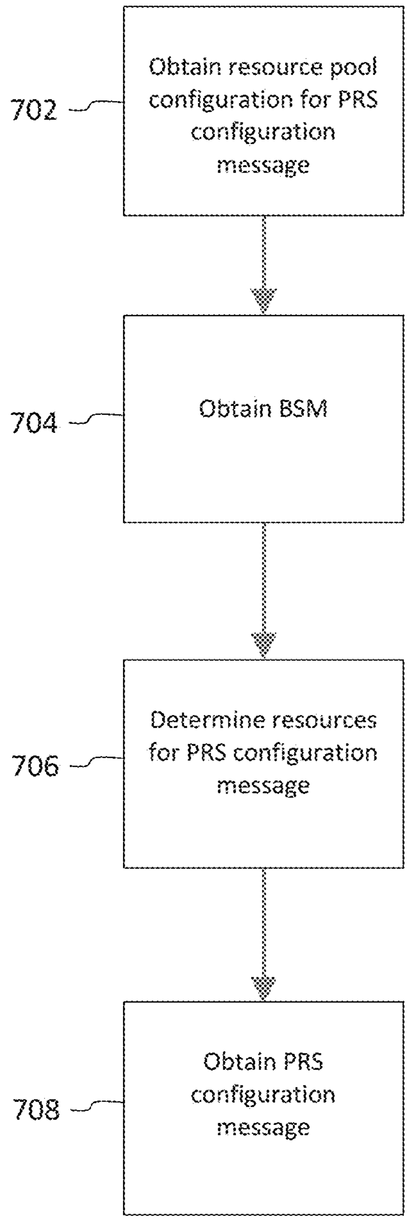
FIG. 7 is a flowchart illustrating a method for automatically obtaining PRS configuration message, according to an embodiment.

FIG. 7 is a flowchart illustrating a method for automatically obtaining the PRS configuration message based on the BSM, according to an embodiment.

At 702, an resource pool configuration for the PRS configuration message is obtained. The PRS configuration message is transmitted in a specific pool. This resource pool may be provided to the UE and can be configured/pre-configured, using RRC signaling. It may be obtained in a manner similar to the procedure for obtaining the zone configuration. In this resource pool, a set of resources is defined. Each resource is referenced by a unique index.

A resource in the resource pool may be a specific sequence (e.g., time, frequency, or code) in the pool, and it may be similar to a discovery signal in LTE device-to-device (D2D).

Transmission may take place on micro subchannels/mini slots. Micro subchannels are not allocated by PSCCH. Based on the UE ID, there is a one-to-one mapping to slot/micro sub channel. Consequently, after obtaining the UE ID of the target UE, the other UE may obtain the resource where the target UE indicates its PRS configuration.

At least two PRS resources may be assigned for each Rx UE (vehicle). These two PRS resources may be transmitted at two different Tx antennas/panels. The association information between the PRS resource index and the Tx antenna/panel index may be determined at the Tx UE and the association information may be conveyed from the Tx UE to the Rx UE through either the SCI or MAC CE if the location is determined at the Rx UE. Having two UEs from different panels on the same vehicle may be necessary to obtain a location using a single vehicle.

In the frequency domain, the PRS for each UE may only occupy a single resource element (RE), and in the time domain, the PRS may be continuous over several symbols.

Figure 8:
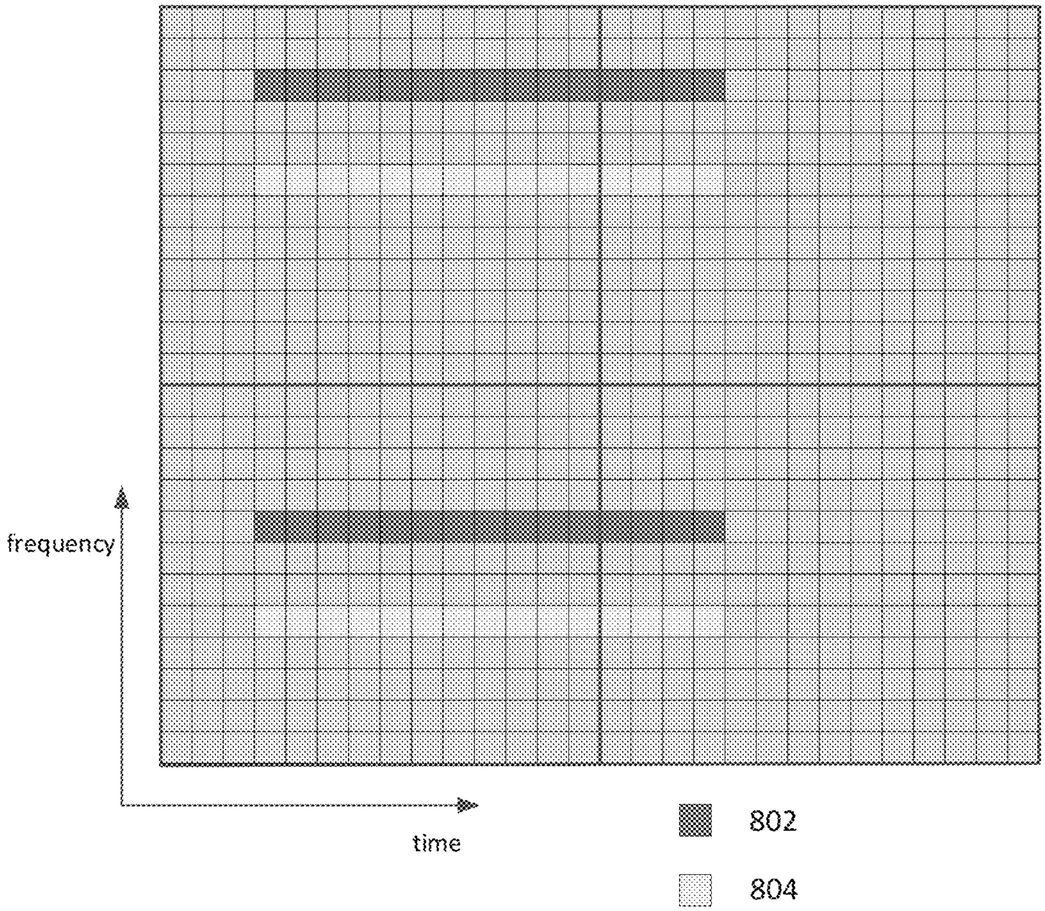
FIG. 8 is a diagram illustrating PRS resource allocation in a resource pool, according to an embodiment.

FIG. 8 is a diagram illustrating resource allocation for a PRS configuration message in an resource pool, according to an embodiment. For each UE, the time domain locations include the starting symbol of the PRS configuration message with respect to the reference slot boundary and the number of consecutive symbols. The frequency domain locations include the frequency location of the PRS configuration message with respect to the reference point and the frequency density of the PRS configuration message (i.e., the gap between two adjacent PRS resources in frequency domain).

The configuration parameters are different for different UEs. First resources 802 for a first UE and second resources 804 for a second UE are illustrated in FIG. 8. The frequency location of the PRS configuration message can vary across different frequency bands.

The concept of BSM region may be used for sidelink positioning reference resources configuration. Specifically, a sidelink Tx and Rx PRS resource pool for positioning may be associated with a BSM region ID. The BSM region may be the same or different with the "zone" in 3GPP Rel-16 sidelink communication. These BSM regions would be known by the UE, and may be pre-configured, for example, by having the UE obtain a map of the BSM region zones, or automatically. For example, on a highway, the zones may be defined by an origin point (e.g., km 0 of the highway) and a distance d. The first section of the highway of distance d from the origin point would be BSM region 0, the next section (between d and 2d) would be region 1, and so forth.

Accordingly, if the BSM region is the same size as the zone size already defined for sidelink (in sidelink, the zone ID is calculated based on the information element (IE) sidelink-ZoneConfig parameter which defines the length and width of the zone), then the zone configuration may be used for BSM region configuration. For 3GPP Rel-17, the possible zone lengths/widths range between 5 and 50 meters based on the RRC configuration. When transmitting or receiving PRSs in sidelink, the UE may select the pool of resources that includes its BSM region ID. Any UE in one BSM region may have a temporary ID and there is a one-to-one correspondence between the PRS resource configuration and the temporary ID in the BSM region. The temporary ID is a subset of the destination ID of the SCI format 2-B in 3GPP Rel-16/17. The PRS configuration may be transmitted in a specific resource pool, in which the transmission can either be a specific sequence (e.g., time, frequency, or code) in the pool, which is similar to discovery signal in LTE D2D or on the micro subchannels/mini slots. Micro subchannels are not allocated by PSCCH. Based on the temporary ID, there is a one-to-one mapping to the slots/micro subchannels. In an extreme case, the size of the temporary ID may be the same as that of the UE ID, which is 16 bits.

Referring back to FIG. 7, at 704, the BSM may be obtained, for example, by obtaining the BSM on an LTE carrier in the industrial, scientific, and medical (ISM) band.

At 706, resources are determined regarding where to find the PRS. From the BSM, the UE determines the target UE ID. The UE ID may be, for example, the 4-byte temporary ID transmitted in the BSM or the X least significant bits (LSBs) of this temporary ID. Based on the target UE ID, the UE determines where to find the PRS transmitted by the UE.

At 708, the UE may receive and decode the PRS configuration message.

In performing collision mitigation, when the number of UE IDs is relatively low, there is a risk of collisions. In such a case, the UE would not be able to accurately obtain its location relative to the target UE. Possible solutions include passive collision mitigation and active collision mitigation.

Figure 9:
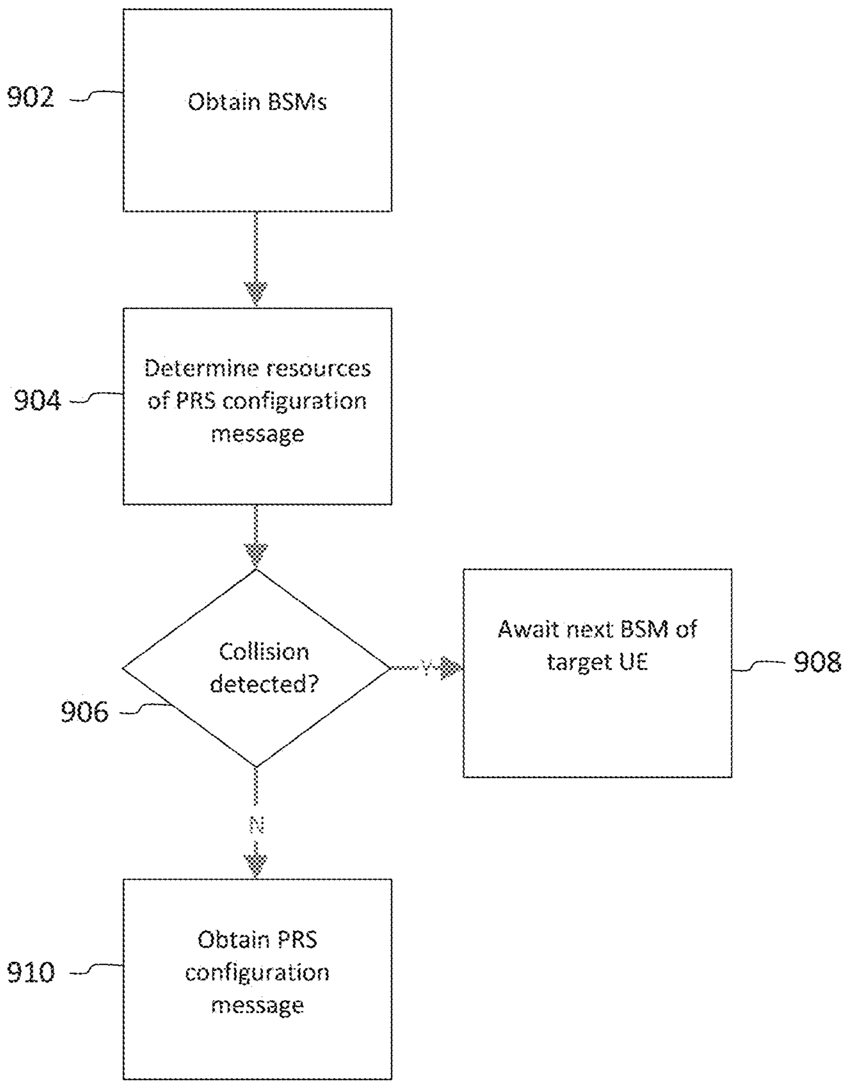
FIG. 9 is a flowchart illustrating a method for passive collision detection and remediation, according to an embodiment.

FIG. 9 is a diagram illustrating passive collision detection and remediation, according to an embodiment.

In passive collision mitigation, collision detection relies on the fact that a UE is able to determine whether there is a collision from the BSMs it decodes. Collision detection relies on the UE obtaining all of the BSMs it is able (an operation that the UE has to perform anyway), at 902. For each BSM, the UE computes the index of the resource indicating the configuration, at 904. The UE determines whether a collision of indexes is detected, at 906. If this index is the same as that for the target UE, the UE determines there is a collision. If a collision is detected, the UE waits for a next BSM of a target UE, at 908. If a collision is not detected, the UE obtains the PRS configuration, at 910.

Passive collision detection and remediation can be achieved by computing the index of the PRS configuration resource using a value different than the temporary UE ID. For example, all bits of the BSM may be taken into account in a hash function, which changes with time, to determine the resource index. At one time instance, the two least significant bytes of the temporary UE ID may be considered, whereas at another time instance, the following two bytes of the temporary UE ID may be considered. Subsequently, if there is a collision of BSMs at a time index t, it is highly unlikely that the two resources will collide on the next time index.

Figure 10:
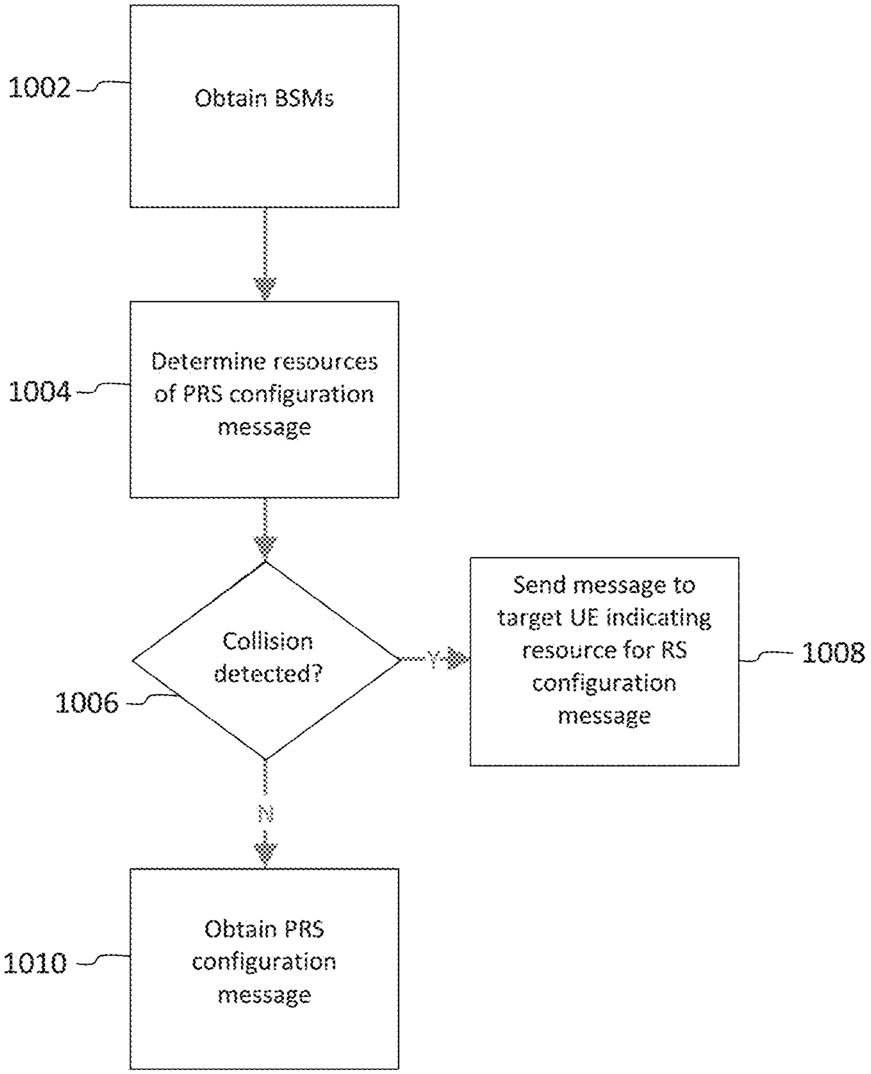
FIG. 10 is a flowchart illustrating a method for active collision detection and remediation, according to an embodiment.

FIG. 10 is a flowchart illustrating a method for active collision detection and remediation, according to an embodiment. Operations 1002, 1004, 1006, and 1010 of FIG. 10 are similar to operations 902, 904, 906, and 910 of FIG. 9.

While passive collision mitigation may work in many circumstances, it is not necessarily a perfect solution. While the chances of two UEs colliding on two consecutive resources is low, there may be a collision with another UE. Thus, if the total number of resources for PRS configuration is low (in order to keep the overhead low), it may take a while for a UE to obtain the PRS configuration due to recurring collisions. In such a case, after a collision has been detected at 1006, the UE may send SCI/message to the target UE to indicate the resource to use, at 1008. This SCI/message may be, for example, a resource index or a special index that is not part of the implicit PRS configuration index determination. This may require the target UE to transmit PRSs at more than one location, if it performs positioning with multiple UEs. Alternatively, the dynamic message may be sent by the target UE.

When a dynamic assignment is received, this supersedes an implicit assignment that may be derived by the UE.

Referring back to FIG. 4, the UE receives the PRSs, at 404, enabling the UE to perform the necessary measurements to determine its location. Accordingly, the UE relies on other UEs transmitting positioning signals.

As described above, the UE may be required to transmit a special RS to enable neighboring UEs to perform phase measurements and identify their relative positions. In order to provide an overall PRS design with low overhead, angle-based methods and carrier phase measurements are focused on since they only require low-bandwidth signals. For example, for carrier phase measurement, only single tones are required. However, this disclosure may be applied to other positioning methods, with either narrowband or wideband RSs.

The PRS may be sent for phase measurements (e.g., a single tone pulse) in a special resource pool. Similar to the PRS configuration message, there is a one-to-one mapping between the PRS index and a UE ID. Alternatively, the PRS ID may be obtained from the PRS configuration message.

Figure 11:
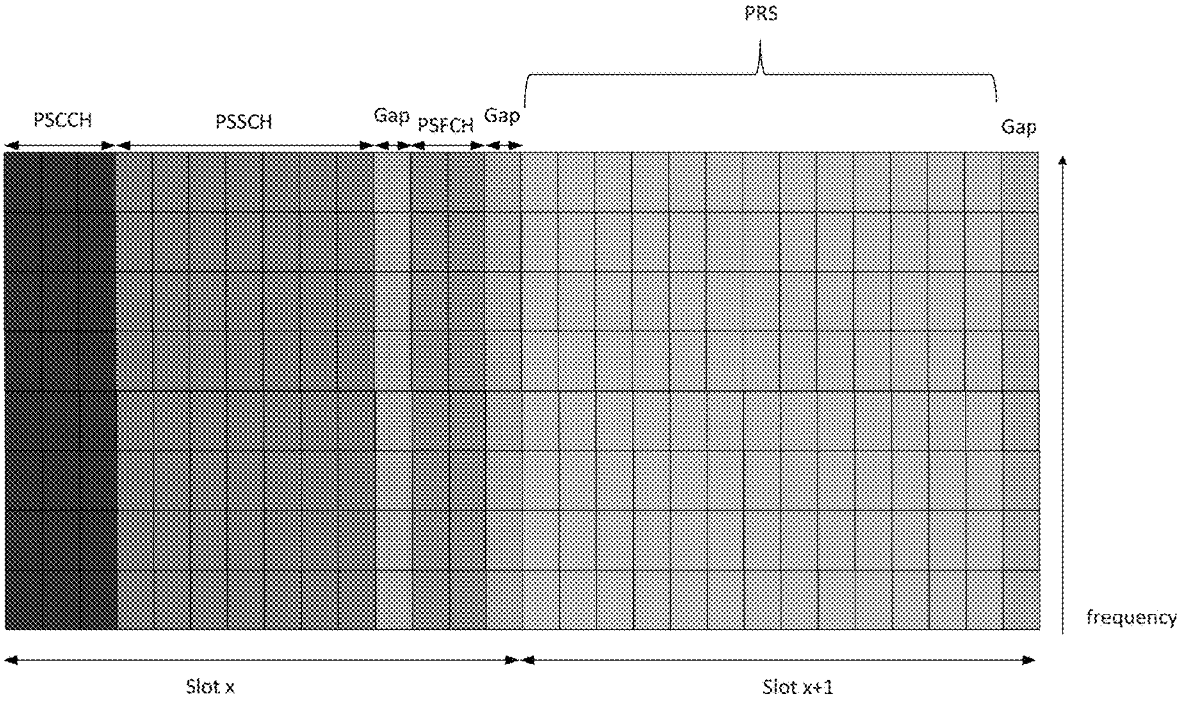
FIG. 11 is a diagram illustrating a single tone PRS sent in a specific slot/subchannel in a special resource pool, according to an embodiment.

FIG. 11 is a diagram illustrating a single tone PRS sent in a specific slot/subchannel in a special resource pool, according to an embodiment. The resource pool may be configured/preconfigured without any PSCCH region. The entire slot (slot x+1) may be used for PRS transmissions. The reservation is performed by the SCI in a regular resource pool. The resource pools are multiplexed in the time domain.

In another embodiment, the special pool may be assigned dedicated RBs and may be contiguous in time. Specifically, the special resource pool may be multiplexed in frequency with the regular resource pool that is used for scheduling.

Figure 12:
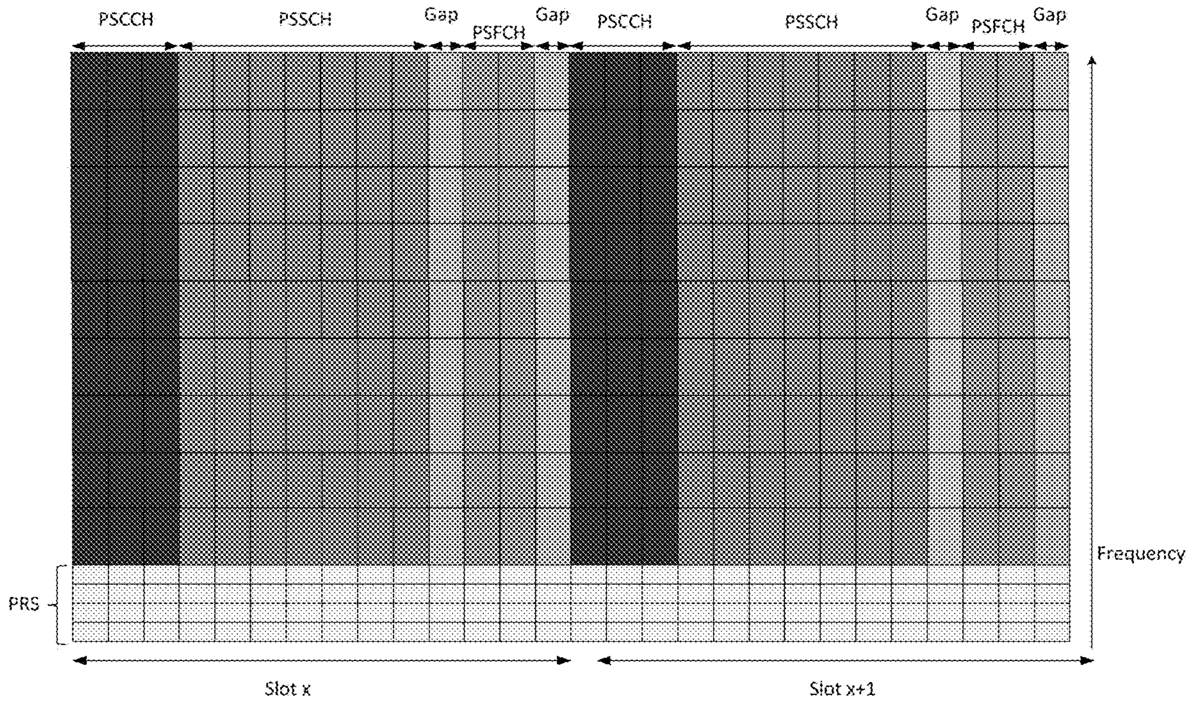
FIG. 12 is a diagram illustrating a single tone PRS sent in a specific slot/tone in a special resource pool, according to an embodiment.

FIG. 12 is a diagram illustrating a single tone PRS sent in a specific slot/tone index in a special resource pool, according to an embodiment. Specifically, FIG. 12 shows an example of the frequency multiplexing of resource pools.

In another embodiment, the UE transmitting the PRSs may reserve the resources for the PRS transmission. In such a case, the reservation in this resource pool may be performed by UEs in a different resource pool (e.g., the regular NR resource pool) with an indication in SCI. Specifically, the special resource pool may be dedicated only for the sidelink PRSs to improve reliability and reduce overhead. For a UE to transmit in this resource pool, it may send a reservation in another normal resource pool by using the first or second stage SCI or MAC CE. This reservation may be performed dynamically in the sense that a UE specifically selects one or more nearby future slots and subchannels over which it will be sending its positioning REs. This may be done by using the regular time resource indicator value (TRIV) and frequency resource indicator value (FRIV) in the SCI but with an indication that this SCI is used to reserve in the special pool. This indication may be either explicit by a special field in the first or second stage SCI or it can be implicit by setting one or more fields to pre-defined values. The subchannel indicated by the FRIV may be used to select the index of the single tone or the resource element(s) that will be used in the special pool. Alternatively, the reservation may be done semi-statically in that a UE selects a specific tone index by using its first or second stage SCI or MAC CE, or by RRC configuration. Subsequently, the UE can then send the sidelink PRSs in the reserved tone over the slots that are dedicated to the special resource pool.

In cases in which the resource pools are multiplexed in the frequency domain, a similar behavior may be considered. In particular, the UE may use the TRIV to select the time slot that it will use to transmit the single tone PRS for sidelink positioning. In addition, the FRIV may be used to indicate the single tone index that will be used by the UE. In the case in which multiple special resource pool exists (e.g., one special resource pool in the guard band before the normal resource pool and another in the guard band after the normal resource pool), a simple indication of a special resource pool in first or second stage SCI is not sufficient. This may be addressed by including the index of the special resource pool in which the UE is performing the reservation. In particular, the first or second stage SCI may include a field that indicates the special resource pool index in which the UE will be transmitting its PRS. Alternatively, a UE may also use a MAC CE or RRC configuration to indicate the special resource pool in cases where the resource pool index does not need to be changed very frequently.

As another signaling alternative for reservations, the special resource pool may include a PSCCH. This PSCCH may be used for reserving single tones within the special resource pool for sending the PRSs. For example, a UE can send SCI to indicate that it reserved a single tone index M in slot X for transmitting its PRS. In addition, this SCI can also be used to carry additional information such as the ID of the UE sending the PRS, its location, the presence of an absolute location and its value, and the priority. The interlacing structure can also be applied to the special resource pool whereby a UE may be assigned more than one single tone to improve the reliability and achieve frequency diversity. In this case, the UE indicates an interlacing index rather than the single tone index.

Considering the high mobility nature of V2X application, an automatic adaptation of the PRS transmission based on speed (obtained from the BSM) may be provided. When the UE is at high speed, a higher density of PRS is needed, and conversely, the PRS density in time may be reduced at lower speeds. To make PRS resource allocation adaptive to the UE speed, separate time and or frequency resource pools may be used for different speed (e.g., one PRS resource pool for the case when UE speed is less than a preconfigured threshold $v_0$, and another PRS resource pool for the case when UE speed is greater than $v_0$). In some cases, especially those involving the high UE speed PRS resource pool, the number of PRS indexes may be less than the number of temporary UE IDs. For example, if the size of temporary IDs is 2048, the number of PRS resource index may be 256 for the case when UE speed is greater than $v_0$. A pre-configured table may be used to determine PRS density based on the UE speed, and channel busy ratio (CBR). Alternatively, the PRS density may be adjusted dynamically based on an SCI indication. In particular, if an SCI or a MAC CE is used to reserve the resources in the special resource pool, it may also include a field that specifies the density of the PRS that is reserved. In such a case, there is no need to configure different resource pools for different speeds, but instead, the density can be indicated by the associated first or second stage SCI or MAC CE. The density indication may also be an index for a set of pre-configured densities for the special resource pool.

Accordingly, the PRS may be transmitted in a special resources pool that may be either time or frequency multiplexed. The special resource pools may contain only the PRS without any control signaling or data. The Tx UEs transmitting the PRS in the special resource pool may be identified by establishing a one-to-one mapping between the temporary UE ID (e.g., the one obtained from the BSM). Alternatively, the resources in the special resource pool may be reserved by transmitting SCIs or MAC CEs in the regular resource pool with an indication. The density of the PRS transmission may be dynamically adjusted based on the UE speed. This may be done by allocating different special resource pools with different densities and limit their access to UEs with certain speeds. Alternatively, the density may be adjusted dynamically based on an indication in the associated SCI or MAC CE.

In another embodiment, the PRS (e.g., single tone) may be sent in specific REs for measurements and may be multiplexed with data. In particular, multiple REs within a subchannel may be dedicated for sending the single tone PRS. The density of these REs (i.e., the number of consecutive REs in the time domain and the number of REs per subchannel) may be configured per resource pool. In addition, the density may be dependent on how occupied the system is based on measurements, such as, for example, the CBR as well as the required accuracy target. In addition, the density may be dependent on the priority of the transmission and may be configured per resource pool. Finally, the density may be selected dynamically by an SCI indication from a set of pre-configured densities. In particular, a set of possible densities may be pre-configured for the resource pool and then the UE may indicate the used PRS density in the associated SCI, as described in greater detail below.

When a UE intends to send the special PRS, it may indicate the presence of the PRS in the associated SCI. In particular, the UE may use the first or second stage SCI to indicate the presence of these PRSs either explicitly by using a dedicated field, or implicitly by setting one or more fields to pre-defined values. In addition, they may be limited to the first subchannel in case of a multi-subchannel reservation or they may exist in multiple subchannels. Moreover, the density of the PRSs within a subchannel/slot may also be indicated in the first or second stage SCI in cases where multiple densities are configured. For example, two configurations may exist in a resource pool, whereby the first configuration indicates that three consecutive REs are used for sending the PRSs and efficiently achieve a position estimate, while the second configuration may indicate that five consecutive REs are used for sending the PRSs to improve the accuracy of the position estimation. The PRSs may be spread across multiple slots (i.e., across the slot boundary). For example, the PRSs may be spread across two consecutive slots whereby the PRSs may occupy all the REs or the REs that are not occupied by the PSCCH (e.g., in case of a multi-subchannel assignment).

Figure 13:
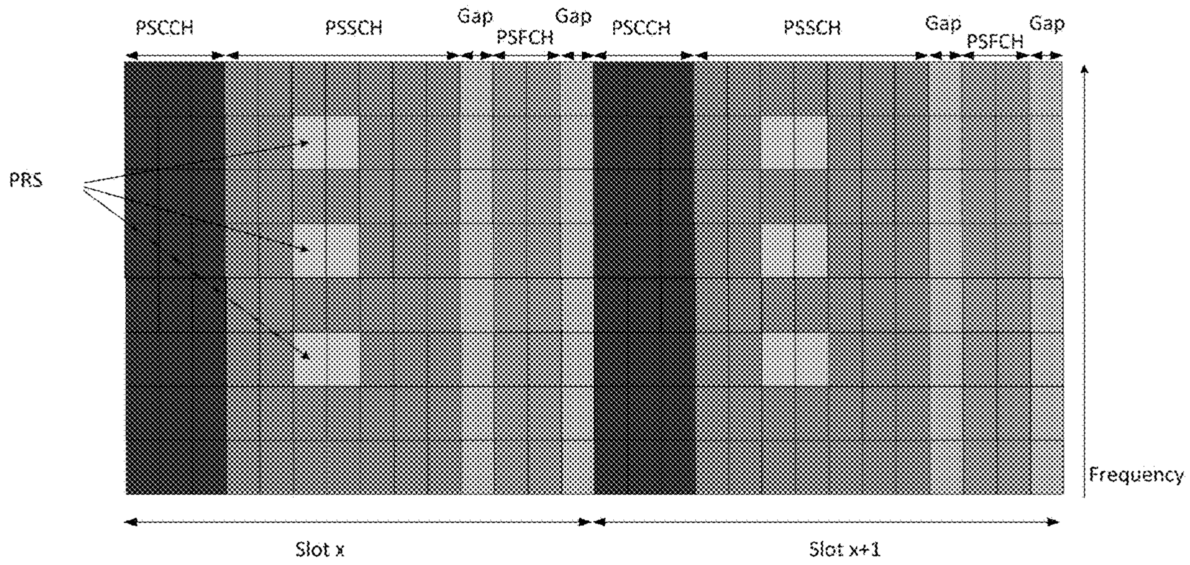
FIG. 13 is a diagram illustrating a single tone PRS sent within a slot/subchannel in specific REs, according to an embodiment.

FIG. 13 is a diagram illustrating a single tone PRS sent within the slot/subchannel in specific REs, according to an embodiment.

To improve the reliability, multiple repetitions of PRSs may be sent within one slot. For example, two sets of REs may be configured per subchannel/slot to improve the reliability of the relative positioning estimate, as described in greater detail below. The REs for sending the PRSs may be reserved by reserving the subchannels containing the REs in a future slot. For example, a UE may use the SCI to reserve subchannel 2 in slot X that is Y slots away, and use the pre-configured REs within this reservation to send the PRS. In addition, a UE may use the first or second stage SCI to indicate that this reservation will include PRSs. This indication may be done either implicitly by setting one or more fields of the SCI to specific values, or explicitly by using a dedicated field that indicates the presence of PRSs.

Figure 14:
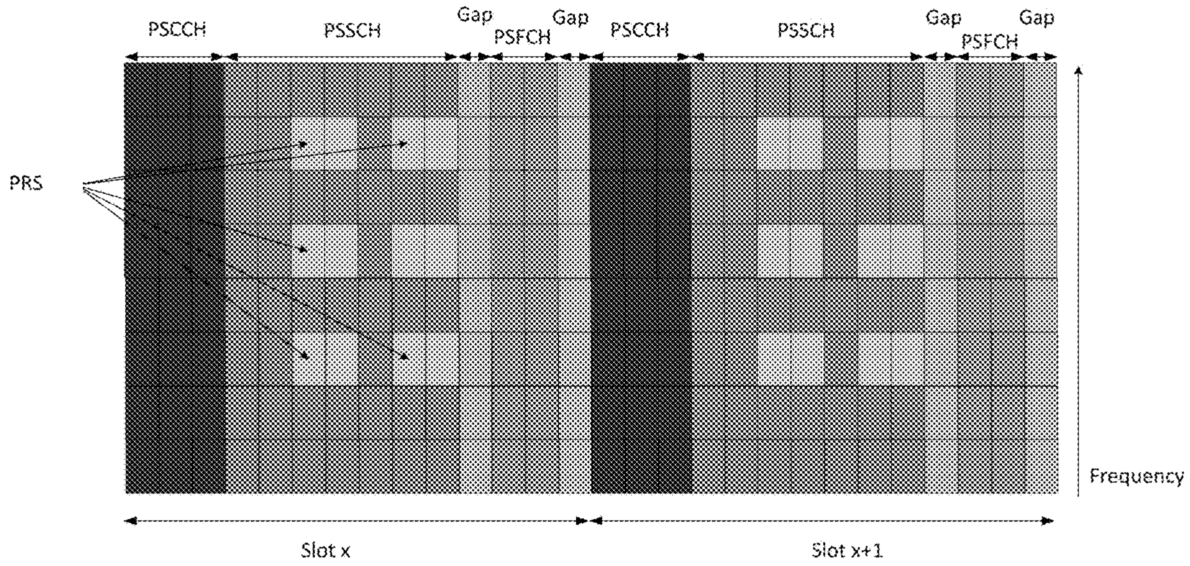
FIG. 14 is a diagram illustrating multiple repetitions of PRSs sent per subchannel/slot, according to an embodiment.

FIG. 14 is a diagram illustrating multiple repetitions of PRSs sent per subchannel/slot to improve the reliability of the relative positioning estimate, according to an embodiment.

Sidelink positioning may be enabled/disabled per resource pool by pre-configuration. The PRSs described above may be sent proactively by the Tx UE when operating in a resource pool in which sidelink positioning is enabled. Alternatively, the PRSs may be requested by a UE from its neighbors. For example, a UE can send a request to its neighbors by setting a field in the first or second stage SCI, by using a MAC CE, or by using RRC configuration. In addition, additional information may be provided along with the request to achieve higher positioning accuracy.

The request may include one or more of the following: the priority, the configuration for the positioning REs, the number of repetitions, the time validity for the positioning assistance request, the intended UE from which the PRS is requested, an indication for a need of an absolute position (e.g., only UEs with absolute position either through GNSS, Uu, or other UEs can send the REs), the largest distance within which UEs should respond to a request (e.g., within a specified zone or multiple zones), and the required accuracy level (e.g., UEs that are nearby can send more PRSs to have better accuracy).

When a UE receives the REs carrying the PRSs from its neighbors, it may consider them differently. For example, the UE may only consider measurements from UEs within a trusted list based on the Tx UE ID, or the UE may consider only the PRSs from UEs that are within a specific distance. In addition, the UE may also consider the PRSs from road side units or vehicular UEs, but not pedestrian UEs. Finally, they UE may discard the processing of additional PRSs if the relative positioning accuracy is already satisfied. This may be helpful to save power. For example, if a UE has requested a PRS transmission from a neighboring UE but already received enough, it may immediately switch to discontinuous reception (DRX) off mode to save power and discard the reception of the requested PRS.

To allow many UEs to simultaneously transmit the PRSs, the multiplexing of multiple UEs' transmissions of PRSs may be allowed. This may also assist in improving the reliability of PRS transmission through frequency diversity. To achieve this goal, an interlaced structure may be considered. For example, a comb 4 structure may be considered whereby a UE can transmit its PRS (e.g., the single tone) on every $4^{th}$ RE from the first available RE within the band. In this case, the selected interlacing index may be indicated in the SCI. The mapping in this case may be different since a UE that transmits its PRSs will not be bounded by the number of its reserved subchannels, but rather with the total number of subchannels available or a subset of these subchannels. For example, each two subchannels may be considered together as a subset and a UE may be allowed to perform a comb-based transmission of its PRSs over this subset. In addition, a UE may also perform the reservation beforehand to avoid conflicts by using a modified version of the TRIV and FRIV fields in the SCI. In particular, a UE may indicate that it will be transmitting the PRS in a slot X which is Y slots away from the current slot and that it will be using an interlacing index 4. In this case, other neighboring UEs may use the remaining interlacing indices within the same slot and subchannels. This interlacing structure may also be repeated across multiple consecutive slots to improve reliability. The number of slots over which the repetitions are sent may be pre-configured per resource pool.

Accordingly, to improve the resource utilization efficiency, the PRS may be multiplexed with data and sent in special REs in regular resource pools. The density of the PRS may be pre-configured per resource pool and may be dependent on CBR and priority. In addition, the density may be dynamically adjusted from a set of pre-configured densities by an indication in SCI. The transmission of PRS may be triggered by a request from the Rx UE or proactively by a set of pre-defined conditions. The request for PRS transmission may include additional information to facilitate the generation of the PRS. A PRS sent by multiple UEs may be multiplexed across the complete band to improve the reliability by considering an interlaced structure.

To achieve better positioning accuracy, in some cases, it may be necessary to send a wide-band sidelink PRS rather than a single tone. This may be helpful when using other positioning techniques rather than the carrier phase method. In this case, a Tx UE may send CSI-RS for positioning across the complete bandwidth. However, it may be necessary to have an interlacing structure to allow multiple UEs to send their PRSs simultaneously (e.g., a comb 2 or a comb 4 structure can be configured per resource pool). In particular, a UE may use its SCI (first or second stage SCI) or a MAC CE to indicate a specific slot in which it intends to transmit its PRSs along with an interlacing index. This reservation does not necessarily cover an entire bandwidth and may be assigned to a subset of the configured subchannels based on resource pool configuration.

In the case of interlacing across the complete band, power may also be considered. In particular, a power constraint may be needed to avoid interference from one UE to another UE in case of the interlaced structure. This can be accounted for by either not using some interlacing indices (i.e., acting as guard bands), or by separating the REs used to transmit the PRS as much as possible (e.g., by multiplexing UE data in between the interlaced REs). In addition, there may be a restriction per resource pool on the number of UEs within a specific zone that can use the interlaced REs for sending their PRSs.

Accordingly, an interlacing structure may be used to allow for the transmission of wide-band PRSs for higher accuracy. The selected interlacing index may be indicated by the first or second stage SCI or MAC CE, and may go beyond the subchannels used by the Tx UE. A power restriction may be applied for PRS transmissions to avoid excessive in-band emissions to transmissions from other UEs.

In order to achieve positioning, UEs must be capable of sending PRSs to their neighbors. By using these signals, UEs may identify their relative location with respect to the neighboring UEs. Subsequently, they may also obtain their absolute position since the absolute location of one or more of their neighbors may be known by the GNSS or the Uu link. However, for this to be realized, it is essential for the PRSs to be sent efficiently.

The high mobility involved in this dynamic environment quickly renders location obsolete. Hence, it is essential that UEs periodically transmit their PRSs.

A large number of neighboring devices may be located within an area. For example, within a 100 $m^2$ a large number of cars/pedestrians may exist.

To minimize the overhead associated with the transmission of PRSs, the periodicity by which the PRSs are transmitted may be dependent on either their measured speed, or the relative speed with respect to their neighboring UEs in case of unicast or groupcast (e.g., the average speed or the highest speed among the members of the group). In addition, PRS transmission may also be triggered based on measured channel occupancy (e.g., using the channel busy ratio CBR). For example, if the CBR is below a pre-configured threshold, the PRSs can be sent more frequently to improve the localization accuracy. On the other hand, when the system is highly occupied, the PRSs may be sent less frequently. The threshold for transmitting the PRSs may be configured per resource pool. The transmission of the PRSs may also be conditioned on the presence of data to transmit so that resources are not wasted. In such a case, the PRSs may be multiplexed with data. Alternatively, a UE may be allowed to transmit with longer periods (i.e., one specific period or a subset of the configured periodicities) if only PRSs are sent without a payload.

The priority of the PRSs may be determined by one or more of an indication by higher layer, pre-configuration per resource pool, dependency on the associated data in case of multiplexing, a priority indicated in the associated request, a priority of the triggering condition, the presence or the absence of an absolute position, the UE type (e.g., a road side unit can have a higher priority), and a time elapsed since a last transmitted PRS, either from the UE or its neighbors.

In addition, UEs that transmit the PRSs must be selected. In particular, a UE with an absolute position from a Uu link may have higher priority to send its PRSs (e.g., it can be allowed to send it more frequently) since the neighboring UEs can rely on that for obtaining their absolute position. Similarly a UE type may impact its ability to send PRSs. For example, a road side unit mat have higher priority to send a PRS compared to vehicular UEs or pedestrian UEs. In addition, a UE may not be allowed to transmit the PRS if it does not have an absolute location from a GNSS or from a Uu link. Furthermore, a UE may be allowed to transmit its PRS only if it is in an out of coverage location or when higher positioning accuracy is requested by higher layers or by an explicit request from a neighboring UE. Finally, a UE may be required to send the PRS based on its location. For example, a UE approaching an intersection is more likely to send PRSs than one exiting an intersection. Similarly, there might be restriction on the number of UEs that are allowed to transmit PRSs per zone. This may be enforced by configuring a specific set of resources that can be used by the UEs to transmit their PRSs.

Accordingly, the periodicity by which the PRSs are sent may be dependent on the UE speed, the CBR, and whether a PRS is multiplexed with data or not. The priority of the transmitted PRS mat be dependent on several factors including the trigger condition, the UE type, and the presence of an absolute location at the Tx UE.

The sidelink PRS resources may be allocated inside or outside of the active BWP. Both of the Tx UE and the Rx UE need to report the capability of supporting the PRS resources outside of the BWP. Subject to UE capability, the UE may indicate this capability, via PC5 RRC, using the following parameters: frequency location and bandwidth, subcarrier spacing (SCS), and cyclic prefix (CP) length.

The PRS resources outside the BWP may be allocated at the edges of the UE operating band, and preconfigured to the UEs. When the UE occupies the PRS resources outside the BWP within a band, the UE sends the occupied resource ID associated with the time and frequency allocation information of the PRS resource in the SCI to avoid the collision with other UEs.

The processing priority of PRS in sidelink is lower than other sidelink signals and channels by default. For the sake of latency reduction, Tx UE may also indicate a PRS processing window to the receivers. Within the processing window, the UE may determine that a sidelink PRS has a higher priority according to the different UE capabilities.

In a first UE capability, there is PRS prioritization over all other DL signals/channels in all symbols inside the window. The sidelink signals/channels from all the component carriers (CCs) (per UE) may be affected, or only the sidelink signals/channels from a certain band/CC are affected.

In a second UE capability, there is PRS prioritization over other sidelink signals/channels only in the PRS symbols inside the window.

The UE may report the capability for the PRS processing window to either the LMF or other UEs via broadcasting. The PRS processing window may be preconfigured at each UE. The Tx UE may activate the PRS processing window for sidelink positioning through sidelink MAC CE or SCI.

When the PRS processing window is activated on sidelink, the following parameters may also need to be indicated by the Tx UE to the Rx UE: staring slot, periodicity, duration/length, cell and SCS information associated with the above parameters, processing type (associated with the corresponding UE capability 1A/1B/2).

The PRS processing window may be requested by the LMF or the target UE to be located by using sidelink positioning.

A UE speed dependent power control mechanism may be developed for determining a transmission power of PRS in sidelink. Principles for power control of sounding reference signals (SRSs) may be reused. If a Tx UE transmits PRS on active BWP b of carrier f, the UE determines the PRS transmission power $P_{PRS,b,f,v}(i,q_s)$ in PRS transmission occasion i as Equation (3) below:

$$P_{PRS,b,f,v}(i, q_s) = \min\left\{\begin{matrix} P_{CMAX,f}(i), \\ P_{O_{PRS},b,f,v}(q_s) + 10\log_{10}(2^{\mu} \cdot M_{PRS,b,f,v}(i)) + \alpha_{PRS,b,f,v}(q_s) \cdot PL_{b,f}(q_d) \end{matrix}\right\} [dBm] \tag{3}$$

where $P_{CMAX,f}(i)$ is the UE configured maximum output power for carrier f in PRS transmission occasion i, $P_{O_{PRS},b,f,v}(q_s)$ is provided by higher layer parameter for active BWP b of carrier f with UE speed v and PRS resource index $q_s$, $M_{PRS,b,f,v}(i)$ is a PRS bandwidth expressed in number of resource blocks for PRS transmission occasion i on active BWP b of carrier f with UE speed v and μ is a SCS configuration, $\alpha_{PRS,b,f,v}$(as) is provided by higher layer parameter for active BWP b of carrier f with UE speed v and PRS resource index $q_s$, and $PL_{b,f}(q_d)$ is a sidelink pathloss estimate in dB calculated by the UE using pathloss PRS resource index $q_d$ for the active BWP of serving cell c and PRS resource index $q_s$. A configuration for PRS resource index $q_d$ is associated with the PRS resource index $q_s$.

When the UE is in a high mobility environment, PRSs have to be received at longer distances than in low mobility environment. Thus, it may be beneficial for power control of the PRS to be dependent on the relative or absolute speed of the UE. The transmit power of the PRS may be dependent on the UE speed in the sense that some parameters for power control may change according to the UE speed.

The following parameters in the PRS transmission power expression may be UE speed dependent: higher layer parameter $P_{O_{PRS},b,f,v}(q_s)$, higher layer parameter $\alpha_{PRS,b,f,v}(q_s)$, and PRS bandwidth $M_{PRS,b,f,v}(i)$.

The values of the above described parameters may be provided in a configured/pre-configured table provided by a higher layer. These parameters may also be dependent on the priority. For example, a higher priority PRS may be sent with a higher power irrespective of the UE speed.

Referring back to FIG. 4, the location may be determined, at 406. Several techniques may be used to determine location. In order to limit positioning overhead, positioning methods include angle-based methods, carrier phase measurements, either at one or two frequencies, and an RTT method.

Figure 15:
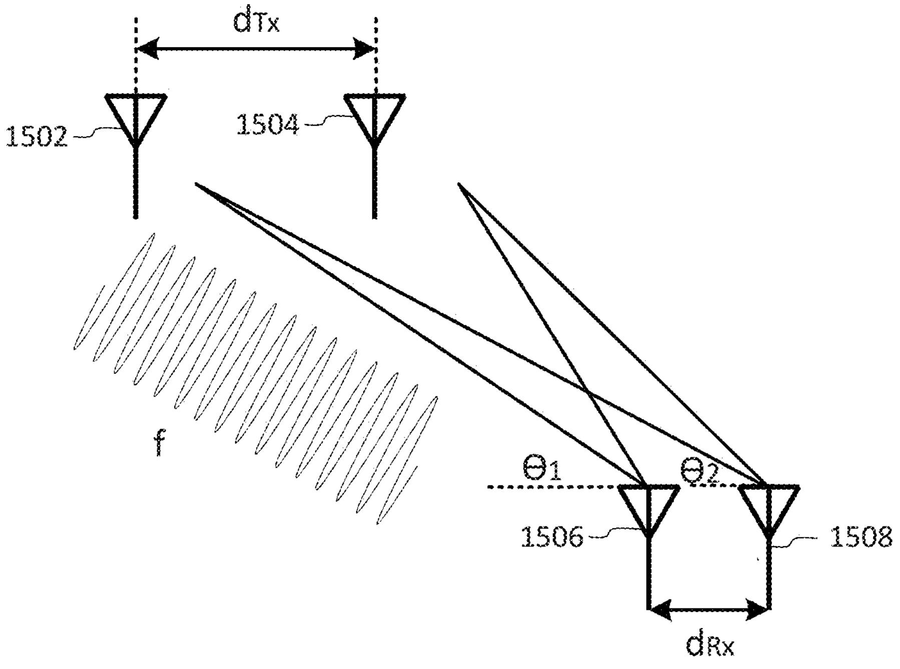
FIG. 15 is a diagram illustrating AoA measurements at multiple receive (Rx) antennas, according to an embodiment.

For angle measurement, the phase difference methods described above may be used. FIG. 15 is a diagram illustrating AoA measurement procedure at two Rx antennas, according to an embodiment.

A UE first measures the carrier phases, $\varphi_1$ and $\varphi_2$, of two received signals from a first transmit antenna 1502 at a first receive antenna 1506 and a second receive antenna 1508. The UE then measures the phase difference $\psi_1=\varphi_1-\varphi_2$. The AoA of the received signal at the first receive antenna, $\theta_1$ is given by Equation (4) below:

$$\theta_1 = \arccos\left(\frac{\psi_1\lambda}{2\pi d_{Rx}}\right) \tag{4}$$

where $d_{Rx}$ is the distance between two Tx antennas.

The UE measures the carrier phases, $\varphi_3$ and $\varphi_4$, of two received signals from a second transmit antenna 1504 at the two receive antennas 1506 and 1508. The UE then measures the phase difference $\psi_2=\varphi_3-\varphi_4$. The AoA of the received signal at the second receive antenna is given by Equation (5) below:

$$\theta_2 = \arccos\left(\frac{\psi_2\lambda}{2\pi d_{Rx}}\right) \tag{5}$$

If the location estimation is performed at Tx UE, the Rx UE may report the two measured phase differences $\psi_1$ and $\psi_2$, and the carrier phase measurements from the first transmit antenna to the two receive antennas (i.e., $\varphi_1$ and $\varphi_2$), and the carrier phase measurements from the second transmit antenna to the two receive antennas (i.e., $\varphi_3$ and $\varphi_4$). Each phase measurement is associated with at least two PRS resource indices corresponding to the PRS resources used for measurement. The association information between the measured carrier phases and the corresponding PRS resource indices may also be reported. If the location estimation is performed at the Rx UE, no measurement report is needed.

The phase measurements at the two receive antennas may be performed simultaneously in a frequency division multiplexing (FDM) manner or sequentially in a time division multiplexing (TDM) manner depending on the PRS resource allocations. If the phase measurement is in FDM manner, the PRS may be transmitted at two different frequency tones.

For the RTT method, both the Tx UE and Rx UE measure the Rx-Tx time difference. The measurement results may be reported to either the Tx UE or the Rx UE depending on which UE performs the location calculation.

For the RTT method, the UE performing the measurements needs to know the antenna (panels) location on the vehicle, as described above, which antenna transmits which PRS, and when/where each PRS is transmitted and with which sequence.

This information may be automatically linked to the BSM, as described above, or may be signaled to the UE with a new signaling message (e.g., RRC signaling).

One way of using a frequency based carrier phase method (F-CPM) is to perform the phase measurements with two frequency tones.

Figure 16:
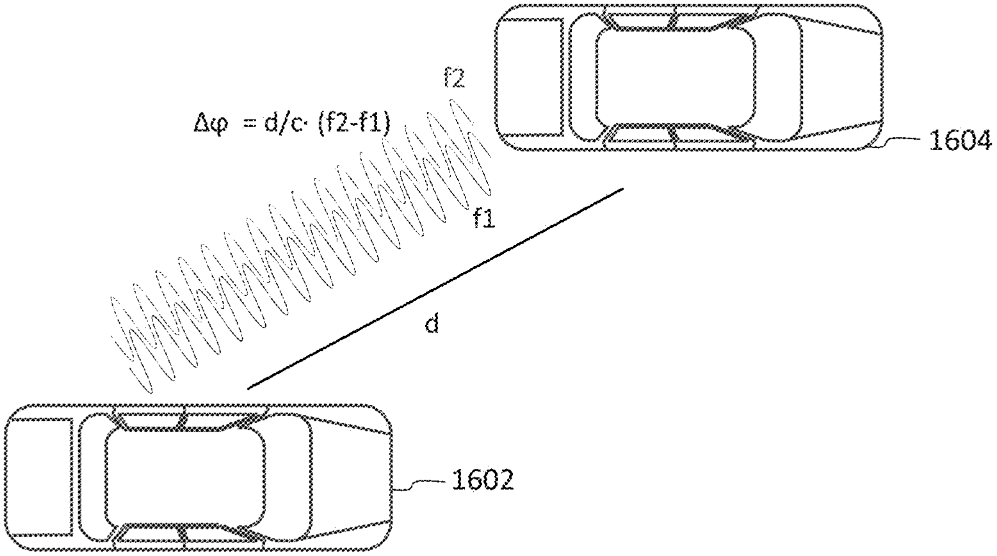
FIG. 16 is a diagram illustrating frequency-based carrier phase measurement, according to an embodiment.

FIG. 16 is a diagram illustrating frequency-based carrier phase measurement, according to an embodiment. A Tx UE 1602 sends the PRSs at two frequency tones at the same time instance to an Rx UE 1604 by using multiple Tx/Rx antennas, or at different time instances.

The antenna layout for F-CPM in sidelink positioning is shown in FIG. 5, in which two Tx antennas and two Rx antennas are equipped in the vehicle. The two Tx antennas are located far away from each other (e.g., Tx antennas are located in the front and the back of the vehicle), and the two Rx antennas are located near each other with small distance d in the vehicle. The PRS may be transmitted from either Tx 1 or Tx 2 by the Tx UE. At the Rx UE, the carrier phases for Rx 1 and Rx2 are measured and reported. The Rx UE also measures the carrier phase difference at two Rx antennas and reports it. The positioning using F-CPM may be done at the RX end of a link, as described below.

The UE determines its position using existing positioning techniques (e.g., TDOA). At this location, the UE determines an exact carrier phase at the Rx. The UE tracks the phase difference and may determine its reference location.

A similar method may be used at the transmitting end of the link. For sidelink positioning, the two frequency tones may be allocated in two different bands in FR1 for high positioning accuracy. Alternatively, the two frequency tones may be sent at different ends of the band by using the PRS resource allocation, as described above. Similarly, if the unlicensed bands or FR2 bands are introduced for sidelink communications, the two frequency tones may be allocated within the same band if the bandwidth is large. While any two frequencies may be used, the larger the frequency difference, the better the location accuracy. Hence, the UE benefits in choosing two PRS frequency references that are as frequency-distant as feasible.

Accordingly, for F-CPM with two frequency tones in sidelink positioning, either the Tx UE or the Rx UE may transmit and receive PRS signals at two different frequencies from two antennas at the same time. After an initial location is established, the Rx/Tx UE may measure the carrier phase difference of two received PRSs at two different frequencies. The two frequencies for PRS transmission may be within the same band or in different bands depending on a positioning accuracy requirement.

The UE may use the same PRS sequence, but transmits it at two different frequencies and possibly time. In such a case, the configuration needs to indicate PRS sequence, PRS frequency f1, and possibility time t1 where f1 is transmitted.

Then, f2, and optionally t2, may be automatically derived from f1 and t1 by applying, for example, a known offset, which may be RRC-configured.

For the application of V2X, the position of UEs may change up to several meters per second. Thus, the UE mobility impact is compensated for in the positioning performance. The disclosed UE mobility compensation mechanism may be applicable to all the scenarios including in-coverage, partial coverage, and out-of-coverage. The out-of-coverage is used as an example of how to mitigate the UE mobility impact to the positioning performance.

Figure 17:
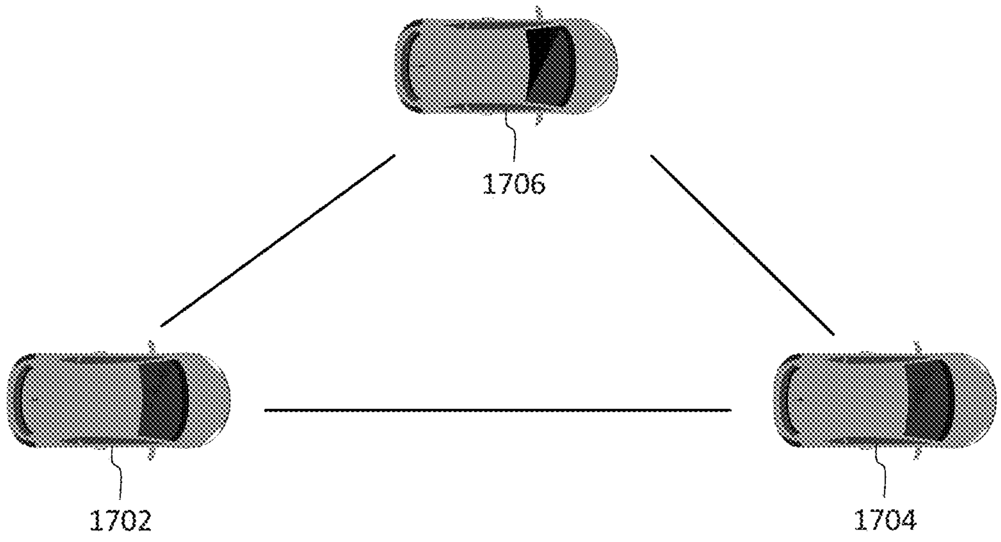
FIG. 17 is a diagram illustrating two UEs synced to a single reference UE, according to an embodiment.

FIG. 17 is a diagram illustrating two UEs synced to a single reference UE, according to an embodiment.

A first UE 1702 measures a Rx-Tx time difference between $t_1$ and $t_4$ and a second UE 1704 measures the Rx-Tx time difference between $t_3$ and $t_2$. The sync errors for the first UE 1702 and the second UE 1704 between a sync ref UE 1706 are $\Delta_{sync,UE1}$ and $\Delta_{sync,UE2}$. $\Delta_{UEi,j}$ is the propagation delay between sync ref UE and UE i at time j. When a UE is moving, $\Delta_{UEi,j}$ may be treated as a random variable. Then for the RTT method, the true timing of the first UE and the second UE are shown in Equations (6) and (7) below:

$$T_1 = t_1 + \Delta_{UE1,1} + \Delta_{sync,UE1} \tag{6}$$

$$T_2 = t_2 + \Delta_{UE2,1} + \Delta_{sync,UE2}$$

$$T_3 = t_3 + \Delta_{UE2,2} + \Delta_{sync,UE2}$$

$$T_4 = t_4 + \Delta_{UE1,2} + \Delta_{sync,UE1}$$

Then:

$$RTT = (T_4 - T_1) - (T_3 - T_2) = (t_4 - t_1) - (t_3 - t_2) + (\Delta_{UE1,2} - \Delta_{UE1,1}) + (\Delta_{UE2,2} - \Delta_{UE2,1}) \tag{7}$$

From the above expression of RTT, the relative distance change between the UE which is making the measurement and the sync ref UE is known, and the device calculating the position may use it to compensate for the impact of UE mobility impact. Since the UE knows its own moving speed, it may estimate the rough distance change during the time period of measurement. Depending on how large the distance change, the change of timing error difference may be classified into different groups, timing difference error groups (TDEGs). When the UE reports the measurements for positioning including Rx-Tx time difference, RSTD, carrier phase (difference), it also informs the device who calculates the position of the associated TDEG ID.

Accordingly, timing difference error is the propagation delay change between the sync ref UE and the UE taking Rx-Tx measurement during the measurement time period. UE TDEG is associated with the measurement for the positioning purpose, which have the UE timing difference errors within a certain margin. The UE may provide the association information of positioning measurements (including carrier phase, Rx-Tx time difference, RSTD) with TDEG when the UE reports the Rx-Tx measurements if the UE has multiple TDEGs. TDEG may be signaled to the other UEs involved in positioning.

Referring back to FIG. 4, at 408, the measurements may be reported. After having established the location, the UE may need to report its measurements. However, this may be optional. Both UEs could transmit positioning signals. Each UE may perform its positioning independently and uses it for its own purposes, but may not report it. However, there may be cases where reporting is useful. In such a case, the message may contain the carrier phase (differences) at two Rx, the AoA, and/or the Rx-Tx time difference at Rx UE.

An indication of the accuracy associated with the measurement may be included in the measurement report.

The content of the message may vary, based on the location. If the UE is close, more information may be transmitted (such as orientation of the car, location of both antennas, etc.). If the UE is faster, less information is needed (e.g., possibly just the location of the center of the car). Based on the figure with multiple zones (please put reference), there may be UEs outside of zones AB (location information through BSM only), a UE in zone A (relative distance and angle from the center of the vehicle (the vehicle is still modeled as a single point)), or a UE in zone B (detailed location information of the car, indicating the area covered by the vehicle (i.e., the vehicle is not modeled as a point any more)).

In addition, information not linked to the location (e.g., braking status) may be included or not depending on the distance between the two cars. The positioning related messages including the assistance data, location information, and capability information may be transmitted through PC5 RRC.

The IE sl-ProvideAssistanceData may be used by the Tx UE to provide assistance data to the Rx UE for carrier phase positioning. The IE sl-RequestAssistanceData may be used by the Rx UE to request assistance data from the Tx UE. The sl-RequestAssistanceData may be carried by PC5 RRC with CG Type 1 or Type 2 transmission.

The IE sl-ProvideLocationInformation may be used by the Rx UE to provide carrier phase location measurements to the Tx UE. It may also be used to provide carrier phase positioning specific error reason. The sl-RequestLocation-Information may be used by the Tx UE to request carrier phase location measurements from a target UE.

The IE sl-ProvideCapabilities may be used by the target UE to indicate its capability to support carrier phase positioning and to provide its carrier phase positioning capabilities to the Tx UE. The sl-MeasurementCapability may define the carrier phase measurement capability. The UE may include this IE only if the UE supports the capability of sidelink PRS for carrier phase positioning. Otherwise, the UE may not include this IE. The IE SL-RequestCapabilities may be used by the Tx UE to request the capability of the target UE to support carrier phase positioning and to request carrier phase positioning capabilities from a target UE.

There may not necessarily be a need for UE to report the positioning measurement if it is UE based positioning in which UE needs to determine the location by itself. If there is reporting, this concerns a few UEs and they may use existing sidelink signaling mechanisms. One issue is for the high speed UEs who need reporting. If they need to do the measurement, the sensing, and the reporting, the latency may be large. One solution could be to use CG-type reporting.

Originally motivated by ultra-reliable and low latency communication (URLLC) service, NR introduced configured grant (CG) uplink transmission, which enables the UL transmission without dynamic grant.

Figure 18:
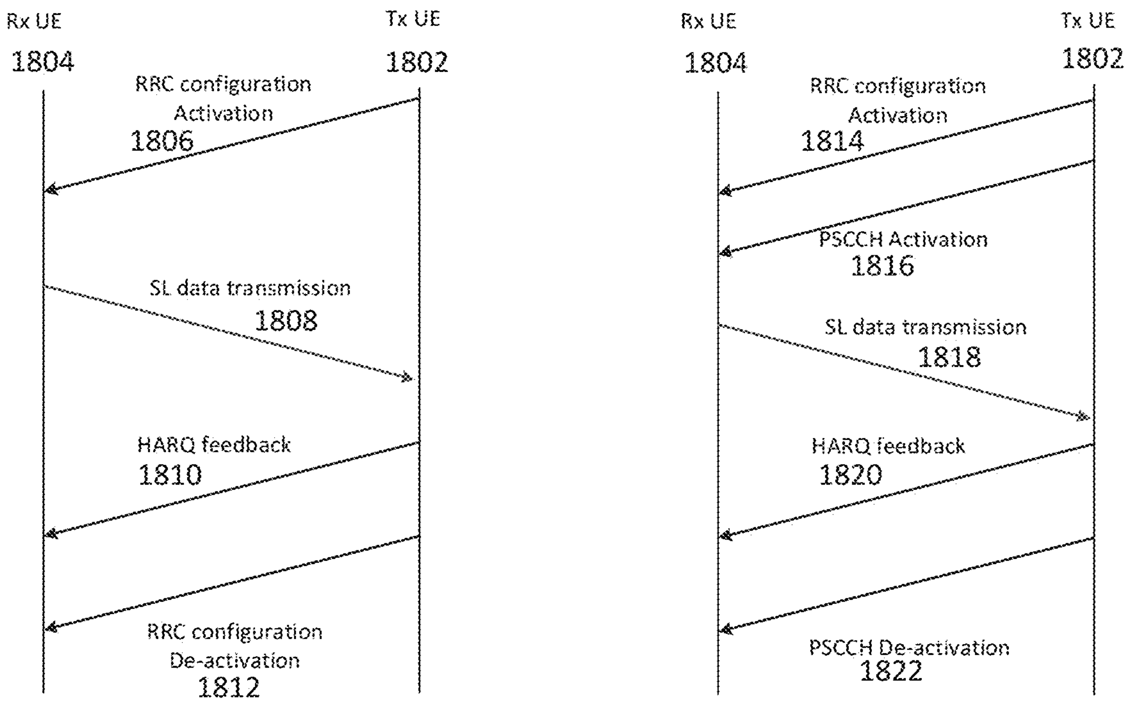
FIG. 18 is a diagram illustrating a sidelink configured grant (CG) type-1 and an sidelink CG type-2, according to an embodiment.

FIG. 18 is a diagram illustrating an sidelink CG type-1 and an sidelink CG type-2, according to an embodiment. In sidelink CG type-1, a sidelink grant configuration is provided by PC5 RRC. Specifically, a Tx UE 1802 performs RRC configuration activation at 1806. An Rx UE 1804 performs sidelink data transmission at 1808. The Tx UE 1802 provides HARQ feedback at 1810, and performs RRC configuration deactivation at 1812.

In sidelink CG type-2, a sidelink grant is provided by PSCCH, and also activated or deactivated by PSCCH. Specifically, the Tx UE 1802 performs RRC configuration activation at 1814, and PSCCH activation at 1816. The Rx UE 1804 performs sidelink data transmission at 1818. The Tx UE 1802 sends HARQ feedback at 1820, and performs PSCCH deactivation at 1822.

An sidelink CG may be used to report the location measurements for sidelink when there is only positioning service and no data transmission. For example, in an F-CPM method, a CG PSSCH to report carrier phase measurement may be configured with the same periodicity as the sidelink PRS, and could be scheduled after the sidelink PRS with a certain time distance to allow UE, taking into account the measurement processing delay and signal generation. The UE may then use the sidelink CG to report the phase measurement.

One issue with using CG as defined right now is that it is at time/locations that are fixed. This may not be appropriate for UEs receiving PRSs with time intervals dependent with speed, etc. Thus, in such a case, the CG resources can be linked to the PRS.

A set of resources is allocated for CG reporting (e.g., in a resource pool). All CG resources are indexed, and there is an association between the CG resource and the PRS resource. When measuring the PRS index i, the UE reports using CG index i.

The UE reports after the PRS measurement. The CG resource to report can be located with, for example, a known time offset after the PRS. With this reporting, the UE reporting is not periodic anymore, but is linked to where the PRS are transmitted. This may be viewed as a 'CG Type 3'.

Another possibility to have more efficient reporting is to let the Tx UE that is sending the PRS signals perform the reservation for the Rx UE. In particular, a new field may be added to the SCI (e.g., the 1$^{st}$ or 2$^{nd}$ stage SCI) to indicate that this reservation can be used by the Rx UE. In this case, the TRIV and FRIV fields may be repurposed in the sense that the resources indicated by these fields will be used for the reporting of positioning measurements rather than being used for future transmissions by the Tx UE. This technique helps in two aspects. This assists in avoiding the hidden node problem since the reservation is performed by the Tx UE that will be receiving the measurement. In addition, this assists in reducing the latency since there is no need for performing sensing after the measurements. There may be a minimum separation between the reserved resources and the transmission of the PRS to allow for processing at the Rx UE and generating the report.

Despite the advantages of this technique, it may not incorporate the sensing results of the Tx UE, and the reserved resources for the positioning report may collide with other UEs' reservations that are near the Rx UE. To address this issue, the Rx UE may also perform sensing and may use the future reserved resource by the Tx UE only if it is within the usable resources that are passed to the higher layer after sensing (i.e., the future reserved resources may be treated as a preferred set of resources). The Tx UE may also provide a set of preferred or a set of non-preferred resources either in the first or second stage SCI instead of making a reservation on behalf of the Rx UE. Subsequently, the Rx UE may incorporate the received resource set when performing the resource selection procedure. For example, it may exclude the set of non-preferred resources from the resources obtained after the sensing operation.

Figure 19:
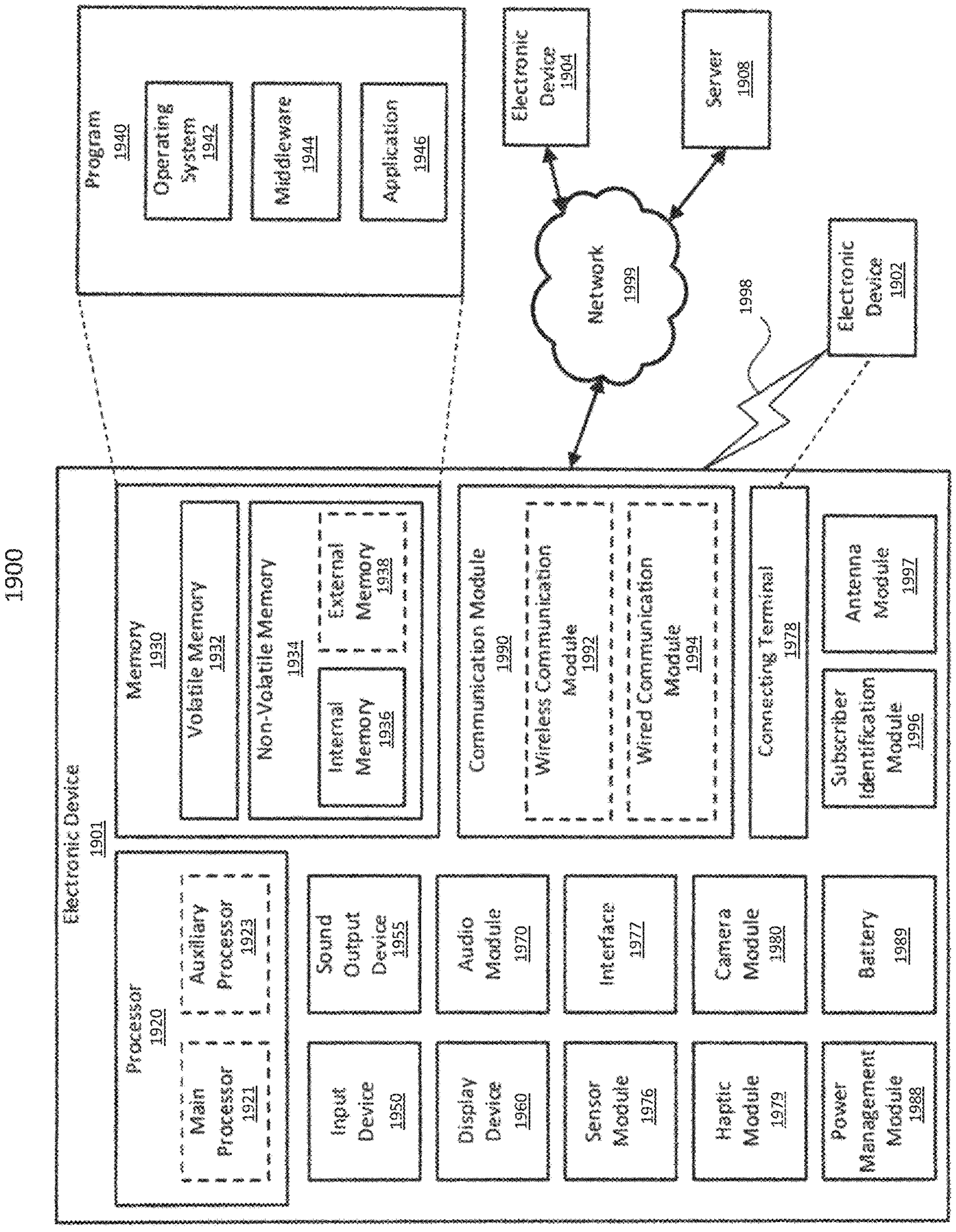
FIG. 19 is a block diagram of an electronic device in a network environment, according to an embodiment.

Referring to FIG. 19, an electronic device 1901 in a network environment 1900 may communicate with an electronic device 1902 via a first network 1998 (e.g., a short-range wireless communication network), or an electronic device 1904 or a server 1908 via a second network 1999 (e.g., a long-range wireless communication network). The electronic device 1901 may communicate with the electronic device 1904 via the server 1908. The electronic device 1901 may be embodied as the transmitting or receiving UE described above, and is in communication with the electronic device 1904 or the server 1908, which may be embodied as the gNB or corresponding UE.

The electronic device 1901 may include a processor 1920, a memory 1930, an input device 1940, a sound output device 1955, a display device 1960, an audio module 1970, a sensor module 1976, an interface 1977, a haptic module 1979, a camera module 1980, a power management module 1988, a battery 1989, a communication module 1990, a subscriber identification module (SIM) card 1996, or an antenna module 1994. In one embodiment, at least one (e.g., the display device 1960 or the camera module 1980) of the components may be omitted from the electronic device 1901, or one or more other components may be added to the electronic device 1901. Some of the components may be implemented as a single integrated circuit (IC). For example, the sensor module 1976 (e.g., a fingerprint sensor, an iris sensor, or an illuminance sensor) may be embedded in the display device 1960 (e.g., a display).

The processor 1920 may execute software (e.g., a program 1940) to control at least one other component (e.g., a hardware or a software component) of the electronic device 1901 coupled with the processor 1920 and may perform various data processing or computations.

As at least part of the data processing or computations, the processor 1920 may load a command or data received from another component (e.g., the sensor module 1946 or the communication module 1990) in volatile memory 1932, process the command or the data stored in the volatile memory 1932, and store resulting data in non-volatile memory 1934. The processor 1920 may include a main processor 1921 (e.g., a central processing unit (CPU) or an application processor (AP)), and an auxiliary processor 1923 (e.g., a graphics processing unit (GPU), an image signal processor (ISP), a sensor hub processor, or a communication processor (CP)) that is operable independently from, or in conjunction with, the main processor 1921. Additionally or alternatively, the auxiliary processor 1923 may be adapted to consume less power than the main processor 1921, or execute a particular function. The auxiliary processor 1923 may be implemented as being separate from, or a part of, the main processor 1921.

The auxiliary processor 1923 may control at least some of the functions or states related to at least one component (e.g., the display device 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). The auxiliary processor 1923 (e.g., an image signal processor or a communication processor) may be implemented as part of another component (e.g., the camera module 1980 or the communication module 1990) functionally related to the auxiliary processor 1923.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934.

The program 1940 may be stored in the memory 1930 as software, and may include, for example, an operating system (OS) 1942, middleware 1944, or an application 1946.

The input device 1950 may receive a command or data to be used by another component (e.g., the processor 1920) of the electronic device 1901, from the outside (e.g., a user) of the electronic device 1901. The input device 1950 may include, for example, a microphone, a mouse, or a keyboard.

The sound output device 1955 may output sound signals to the outside of the electronic device 1901. The sound output device 1955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1960 may visually provide information to the outside (e.g., a user) of the electronic device 1901. The display device 1960 may include, for example, a display, a hologram device, or a projector and control circuitry to control a corresponding one of the display, hologram device, and projector. The display device 1960 may include touch circuitry adapted to detect a touch, or sensor circuitry (e.g., a pressure sensor) adapted to measure the intensity of force incurred by the touch.

The audio module 1970 may convert a sound into an electrical signal and vice versa. The audio module 1970 may obtain the sound via the input device 1950 or output the sound via the sound output device 1955 or a headphone of an external electronic device 1902 directly (e.g., wired) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. The sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device 1902 directly (e.g., wired) or wirelessly. The interface 1977 may include, for example, a high-definition multimedia interface (HDMI), a universal serial bus (USB) interface, a secure digital (SD) card interface, or an audio interface.

A connecting terminal 1978 may include a connector via which the electronic device 1901 may be physically connected with the external electronic device 1902. The connecting terminal 1978 may include, for example, an HDMI connector, a USB connector, an SD card connector, or an audio connector (e.g., a headphone connector).

The haptic module 1979 may convert an electrical signal into a mechanical stimulus (e.g., a vibration or a movement) or an electrical stimulus which may be recognized by a user via tactile sensation or kinesthetic sensation. The haptic module 1979 may include, for example, a motor, a piezoelectric element, or an electrical stimulator.

The camera module 1980 may capture a still image or moving images. The camera module 1980 may include one or more lenses, image sensors, image signal processors, or flashes. The power management module 1988 may manage power supplied to the electronic device 1901. The power management module 1988 may be implemented as at least part of, for example, a power management integrated circuit (PMIC).

The battery 1989 may supply power to at least one component of the electronic device 1901. The battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more communication processors that are operable independently from the processor 1920 (e.g., the AP) and supports a direct (e.g., wired) communication or a wireless communication. The communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™, wireless-fidelity (Wi-Fi) direct, or a standard of the Infrared Data Association (IrDA)) or the second network 1999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The antenna module 1997 may transmit or receive a signal or power to or from the outside (e.g., the external electronic device) of the electronic device 1901. The antenna module 1997 may include one or more antennas, and, therefrom, at least one antenna appropriate for a communication scheme used in the communication network, such as the first network 1998 or the second network 1999, may be selected, for example, by the communication module 1990 (e.g., the wireless communication module 1992). The signal or the power may then be transmitted or received between the communication module 1990 and the external electronic device via the selected at least one antenna.

Commands or data may be transmitted or received between the electronic device 1901 and the external electronic device 1904 via the server 1908 coupled with the second network 1999. Each of the electronic devices 1902 and 1904 may be a device of a same type as, or a different type, from the electronic device 1901. All or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1901. The electronic device 1901 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:

obtaining, by a user equipment (UE), a positioning reference signal (PRS) configuration message from an anchor UE, wherein the PRS configuration message is generated based on at least one parameter included in a basic safety message (BSM) of the anchor UE to determine at least one PRS transmission parameter including a transmit power of a sidelink PRS;
receiving, by the UE, the sidelink PRS from the anchor UE based on the PRS configuration message; and
performing, by the UE, a positioning measurement based on the sidelink PRS.

2. The method of claim 1, wherein obtaining the PRS configuration message comprises:
determining, by the UE, a resource pool configuration for the PRS configuration message;
receiving, by the UE, the BSM of the anchor UE;
receiving, by the UE, the PRS configuration message from the anchor UE based on the resource pool configuration and the BSM.

3. The method of claim 1, wherein transmission of the PRS configuration message by the anchor UE is triggered by sidelink control information (SCI) or a medium access control (MAC) control element (CE).

4. The method of claim 1, wherein receiving the PRS configuration message comprises:
determining an identifier of the anchor UE based on the BSM; and
determining resources having the PRS configuration message based on the identifier of the anchor UE.

5. The method of claim 1, further comprising:
determining, by the UE, whether a UE identifier collision is detected based on the BSM and another received BSM;
in case that the UE identifier collision is detected:
await a next BSM from the anchor UE; or
transmit a message to the anchor UE indicating a resource for the PRS configuration message to be transmitted by the anchor UE.

6. The method of claim 1, wherein the PRS is multiplexed in time with data of a resource pool and received in a subchannel of the resource pool, or is multiplexed in frequency with the data of the resource pool and received in a tone of the resource pool.

7. The method of claim 1, wherein multiple repetitions of the PRS are received in resource elements (REs) of a subchannel in a resource pool.

8. The method of claim 1, wherein the PRS is prioritized over at least one of other downlink signals within a PRS processing window and other sidelink signals in symbols of the PRS within the PRS processing window.

9. The method of claim 1, wherein the transmit power of the sidelink PRS is dependent on a speed of the anchor UE.

10. The method of claim 1, wherein the location of the UE is determined based on a frequency-based carrier phase method using at least one of PRSs at two different frequencies and angle of arrival (AoA) measurements.

11. The method of claim 1, wherein determining the location of the UE comprises compensating for mobility of the UE in determining the location of the UE using round trip time (RTT) measurements with a reference UE.

12. The method of claim 1, further comprising reporting the location of the UE.

13. The method of claim 1, further comprising:
determining, by the UE, zones surrounding the UE;
obtaining, by the UE, a location of the anchor UE based on the BSM; and
determining, by the UE, zone information of the anchor UE based on the location of the anchor UE and the determined zones,
wherein the positioning of the UE is determined based on the zone information of the anchor UE.

14. A user equipment (UE) comprising:
a processor; and
a non-transitory computer readable storage medium storing instructions that, when executed, cause the processor to:
obtain a positioning reference signal (PRS) configuration message from an anchor UE, wherein the PRS configuration message is generated based on at least one parameter included in a basic safety message (BSM) of the anchor UE to determine at least one PRS transmission parameter including a transmit power of a sidelink PRS;
receive the sidelink PRS from the anchor UE based on the PRS configuration message; and
perform a positioning measurement based on the sidelink PRS.

15. The UE of claim 14, wherein, in obtaining the PRS configuration message, the instructions further cause the processor to:
determine a resource pool configuration for the PRS configuration message;
receive the BSM from the anchor UE; and
receive the PRS configuration message from the anchor UE based on the resource pool configuration and the BSM,
wherein transmission of the PRS configuration message by the anchor UE is triggered by sidelink control information (SCI) or a medium access control (MAC) control element (CE).

16. The UE of claim 14, wherein the instructions further cause the processor to:
determine whether a UE identifier collision is detected based on the BSM and another received BSM; and
in case that the UE identifier collision is detected:
await a next BSM from the anchor UE; or
transmit a message to the anchor UE indicating a resource for the PRS configuration message to be transmitted by the anchor UE.

17. The UE of claim 14, wherein:
the PRS is multiplexed in time with data of a resource pool and received in a subchannel of the resource pool, or is multiplexed in frequency with the data of the resource pool and received in a tone of the resource pool; or
multiple repetitions of the PRS are received in resource elements (REs) of a subchannel in the resource pool.

18. The UE of claim 14, wherein:
the PRS is prioritized over at least one of other downlink signals within a PRS processing window and other sidelink signals in symbols of the PRS within the PRS processing window;
the transmit power of the sidelink PRS is dependent on a speed of the anchor UE; and
the location of the UE is determined based on a frequency-based carrier phase method using at least one of PRSs at two different frequencies and angle of arrival (AoA) measurements.

19. The UE of claim 14, wherein the instructions further cause the processor to:
determine zones surrounding the UE;
obtain a location of the anchor UE based on the BSM; and
determine zone information of the anchor UE based on the location of the anchor UE and the determined zones,
wherein positioning accuracy of the UE is determined based on the zone information of the anchor UE.

20. A system comprising:

a first user equipment (UE) configured to obtain a positioning reference signal (PRS) configuration message, wherein the PRS configuration message is generated based on at least one parameter included in a basic safety message (BSM) to determine at least one PRS transmission parameter including a transmit power of a sidelink PRS, receive the sidelink PRS based on the PRS configuration message, and perform a positioning measurement based on the received PRS.

* * * * *